(12) United States Patent
Rushbrook

(10) Patent No.: US 10,034,515 B2
(45) Date of Patent: Jul. 31, 2018

(54) ARTICLE OF FOOTWEAR HAVING GROUND SURFACE MATERIAL ACCUMULATION PREVENTION STRUCTURE

(71) Applicant: Thomas J. Rushbrook, Portland, OR (US)

(72) Inventor: Thomas J. Rushbrook, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 22 days.

(21) Appl. No.: 15/036,559

(22) PCT Filed: Nov. 13, 2014

(86) PCT No.: PCT/US2014/065383
§ 371 (c)(1),
(2) Date: May 13, 2016

(87) PCT Pub. No.: WO2015/073631
PCT Pub. Date: May 21, 2015

(65) Prior Publication Data
US 2016/0295960 A1    Oct. 13, 2016

Related U.S. Application Data

(60) Provisional application No. 61/904,742, filed on Nov. 15, 2013.

(51) Int. Cl.
*A43C 15/16* (2006.01)
*A43B 13/18* (2006.01)
(Continued)

(52) U.S. Cl.
CPC .............. *A43B 13/184* (2013.01); *A43B 5/02* (2013.01); *A43B 13/04* (2013.01); *A43B 13/122* (2013.01);
(Continued)

(58) Field of Classification Search
CPC ........... A43B 5/02; A43B 13/00; A43B 13/14; A43B 13/18; A43B 13/181; A43B 13/184;
(Continued)

(56) References Cited

U.S. PATENT DOCUMENTS 3,043,026 A * 7/1962 Semon ................... A43C 13/04
36/134
3,820,255 A    6/1974 Davis
(Continued)

FOREIGN PATENT DOCUMENTS

GB        2322534 A    9/1998

OTHER PUBLICATIONS

International Searching Authority, International Search Report and Written Opinion for PCT Application No. PCT/US2014/065383, dated Feb. 13, 2015.

*Primary Examiner* — Marie Bays
(74) *Attorney, Agent, or Firm* — Honigman Miller Schwartz and Cohn LLP; Matthew H. Szalach; Jonathan P. O'Brien

(57) ABSTRACT

An article of footwear includes a sole having a lower surface, and a reactive element disposed on the lower surface of the sole. The reactive element has an exposed surface, and the reactive element is configured to transition the exposed surface between a first state and a second state in response to a compression force applied to the reactive element by an external ground surface in a user activity, to prevent accumulation of ground surface material, such as mud, dirt, clay, sand, slush, etc., compacting on the sole of the article of footwear in the user activity. The reactive element may include an elastomeric dome shaped popper that compresses flat in response to a compression force and
(Continued)

then pops back to a non-compressed state in response to release of the compression force.

12 Claims, 17 Drawing Sheets

(51) Int. Cl.
| | |
|---|---|
| A43C 13/00 | (2006.01) |
| A43B 5/02 | (2006.01) |
| A43B 13/12 | (2006.01) |
| A43B 13/14 | (2006.01) |
| A43B 13/20 | (2006.01) |
| A43C 19/00 | (2006.01) |
| A43B 13/04 | (2006.01) |
| A43C 15/02 | (2006.01) |
| B29C 51/10 | (2006.01) |
| B29C 51/42 | (2006.01) |
| B29C 65/00 | (2006.01) |
| B29C 51/36 | (2006.01) |
| B29K 105/20 | (2006.01) |
| B29K 105/00 | (2006.01) |
| B29L 31/50 | (2006.01) |

(52) U.S. Cl.
CPC ............ *A43B 13/14* (2013.01); *A43B 13/141* (2013.01); *A43B 13/186* (2013.01); *A43B 13/188* (2013.01); *A43B 13/20* (2013.01); *A43C 13/00* (2013.01); *A43C 15/02* (2013.01); *A43C 15/161* (2013.01); *A43C 15/165* (2013.01); *A43C 15/167* (2013.01); *A43C 15/168* (2013.01); *A43C 19/00* (2013.01); *B29C 51/10* (2013.01); *B29C 51/428* (2013.01); *B29C 65/002* (2013.01); *B29C 51/36* (2013.01); *B29K 2105/20* (2013.01); *B29K 2105/256* (2013.01); *B29L 2031/50* (2013.01)

(58) Field of Classification Search
CPC ....... A43B 13/26; A43C 13/00; A43C 15/168; A43C 19/00; A43C 15/08
USPC .................... 36/114, 132, 136, 25 R, 28, 61
See application file for complete search history.

(56) References Cited

U.S. PATENT DOCUMENTS

| | | | | |
|---|---|---|---|---|
| 4,146,979 | A * | 4/1979 | Fabbrie | A43C 15/167 36/127 |
| 4,271,608 | A * | 6/1981 | Tomuro | A43C 15/165 36/127 |
| 4,715,133 | A * | 12/1987 | Hartjes | A43B 5/001 36/127 |
| 4,774,776 | A | 10/1988 | Gulli | |
| 6,516,540 | B2 * | 2/2003 | Seydel | A43B 13/16 36/25 R |
| 6,698,110 | B1 * | 3/2004 | Robbins | A43B 5/185 36/134 |
| 2002/0178620 | A1 * | 12/2002 | Asciolla | A43B 13/36 36/132 |
| 2008/0209766 | A1 * | 9/2008 | Braunschweiler | A43B 13/184 36/102 |
| 2016/0278484 | A1 * | 9/2016 | Aslani | A43B 3/166 |
| 2016/0286905 | A1 * | 10/2016 | Schiller | A43B 3/166 |
| 2016/0295960 | A1 * | 10/2016 | Rushbrook | A43B 5/02 |

* cited by examiner

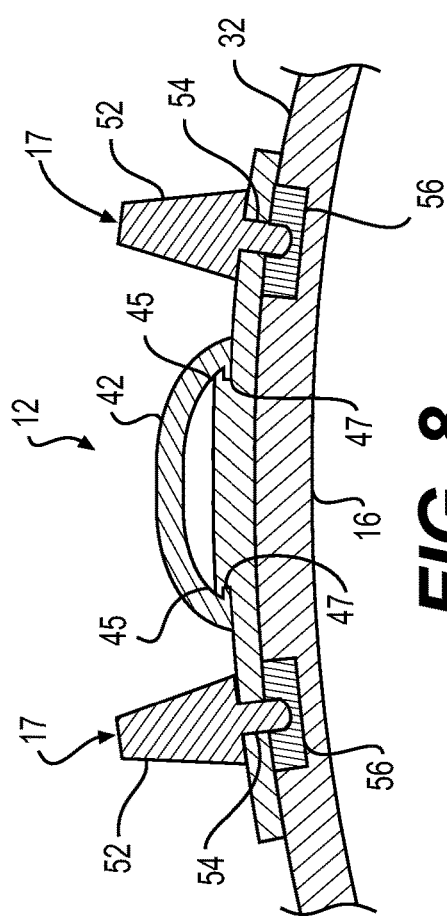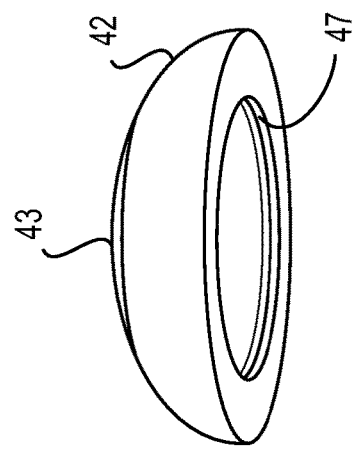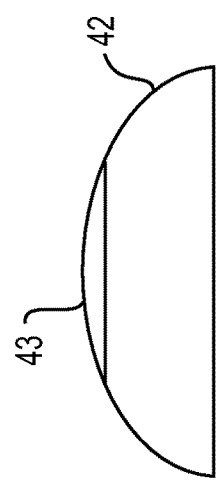

ARTICLE OF FOOTWEAR HAVING GROUND SURFACE MATERIAL ACCUMULATION PREVENTION STRUCTURE

CROSS REFERENCE TO RELATED APPLICATIONS

This application is the national phase of International Application No. PCT/US2014/065383, filed Nov. 13, 2014, which claims the benefit of U.S. Provisional Patent Application No. 61/904,742, filed Nov. 15, 2013, the disclosures of which are hereby incorporated by reference in their entirety.

FIELD

The present invention relates generally to an article of footwear and, more particularly, to a sports shoe with cleats.

BACKGROUND

An article of footwear may be used on many alternative types of ground surfaces. An article of footwear having at least one ground surface traction element may be used to provide better traction on certain types of ground surface. In each case, use of an article of footwear in some types of ground surfaces, e.g., mud or slush, may result in accumulation of compacted ground surface material on the lower surface of the article of footwear. Accumulation of ground surface material on the lower surface of an article of footwear may reduce traction of the article of footwear and/or adversely affect performance characteristics of the article of footwear and the user.

BRIEF DESCRIPTION OF THE DRAWINGS

The invention may be better understood with reference to the following drawings and description. Components in the figures are not necessarily to scale, emphasis instead being placed upon illustrating principles of the invention. In the figures, like reference numerals designate corresponding parts throughout the different views, with the initial digit(s) of each reference number indicating the figure in which the feature is first shown.

FIG. 8 is a cross-sectional view of a second embodiment of a ground surface material accumulation prevention structure of FIG. 4 taken along section line 5-5 of FIG. 2.

FIG. 9 is a profile view of an embodiment of a reactive element of the ground surface material accumulation prevention structure of FIG. 8.

FIG. 10 is a perspective view of the reactive element of FIG. 9.

DETAILED DESCRIPTION

Figure 1:
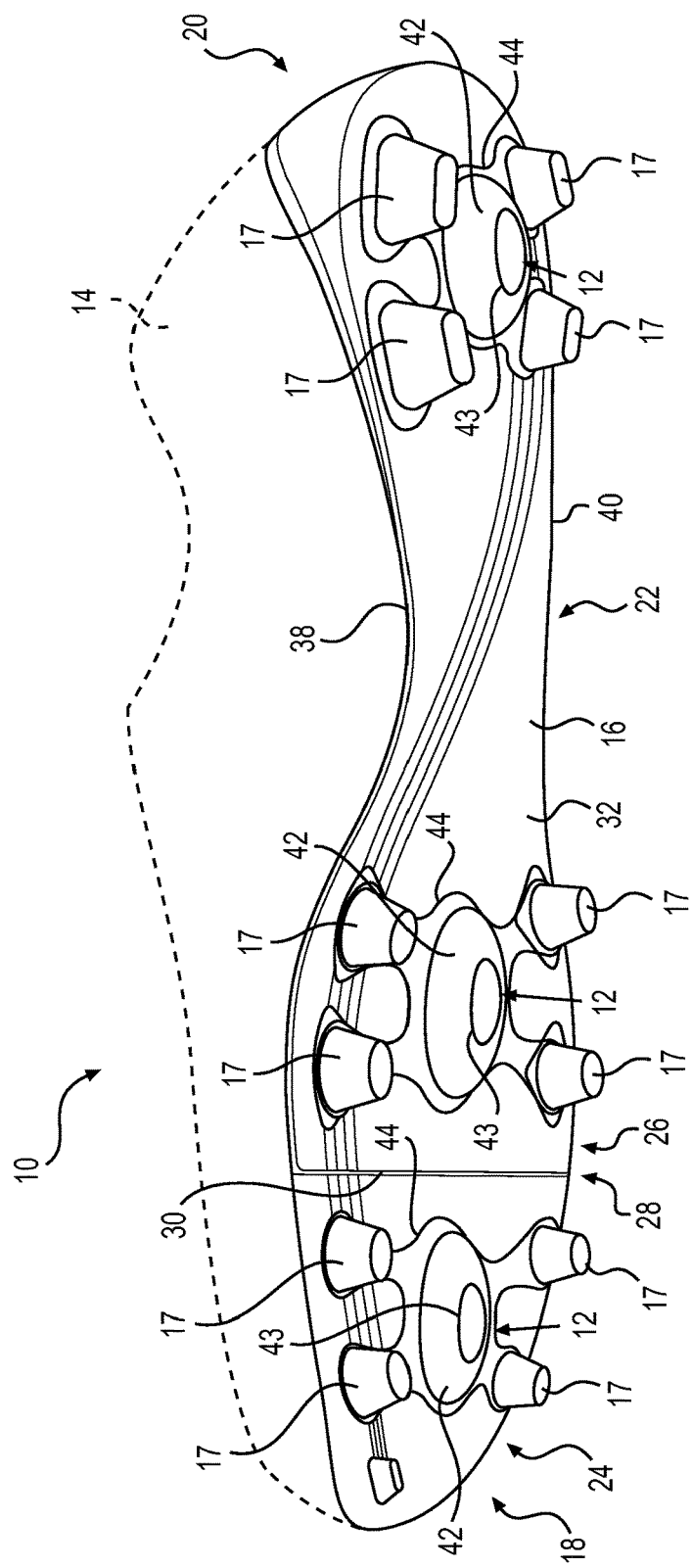
FIG. 1 is a perspective view of an embodiment of an article of footwear including ground surface material accumulation prevention structure according to the present invention.

In one aspect, an article of footwear may comprise a sole and a reactive element. The sole may have a lower surface. The reactive element may be disposed on the lower surface of the sole. The reactive element may have an exposed surface, and the reactive element may be configured to transition the exposed surface between a first state and a second state in response to a compression force applied to the reactive element by an external ground surface in a user activity, to prevent accumulation of ground surface material compacting on the sole of the article of footwear in the user activity.

In some embodiments, the reactive element may further comprise webbing configured to secure the reactive element on the lower surface of the sole.

In some embodiments, the reactive element may be integrally formed with the lower surface of the sole by bonding or molding.

In some embodiments, the sole may further comprise at least one ground surface traction element disposed on the lower surface of the sole, and the reactive element may be secured to the lower surface of the sole by the at least one ground surface traction element.

In some embodiments, the at least one ground surface traction element may include at least one cleat that is removably secured to the lower surface of the sole, and the reactive element may be secured to the lower surface of the sole by the at least one cleat.

In some embodiments, the reactive element may be secured to the lower surface of the sole by securing the at least one cleat to the lower surface of the sole with the webbing disposed between the at least one cleat and the lower surface of the sole.

In some embodiments, a configuration of the reactive element may conform to a configuration of plural ground surface traction elements disposed on the lower surface of the sole.

In some embodiments, the article of footwear may further include a webbing configured to secure the reactive element to the lower surface of the sole of the article of footwear. In such embodiments, the webbing and the resilient member may be formed by a unitary resilient material.

In some embodiments, the reactive element may comprise an elastomeric polymer dome, and the elastomeric polymer dome may be optionally made of a thermoplastic or thermosetting material.

In some embodiments, the elastomeric polymer dome may have a symmetric shape or an elongated shape.

In some embodiments, the webbing may include a tab associated with a ground surface traction element on the lower surface of the sole to secure the resilient member to the lower surface of the sole of the article of footwear.

In some embodiments, the tab of the webbing may include a through-hole configured to engage a portion of the ground surface traction element.

In some embodiments, the ground surface traction element may be a cleat, and the portion of the cleat may be a screw-in base portion that passes through the through-hole to capture the tab of the webbing between the cleat and the lower surface of the sole.

In some embodiments, in the first state, the exposed surface portion may be in a compressed state proximal the lower surface of the sole. In some embodiments, in the second state, the exposed surface portion may be in a decompressed state distal of the lower surface of the sole relative to the first state.

In some embodiments, the reactive element may be configured to transition the exposed surface to the first state in response to a compression force applied between the sole of the article of footwear and the external ground surface and to the second state in response to release of the compression force.

In some embodiments, the reactive element may include a resilient member having a spring constant k.

In one aspect, a method of making an article of footwear may include a step of providing a sole having a lower surface. The method may further include a step of placing a reactive element on the lower surface of the sole. The reactive element may have an exposed surface, and the reactive element may be configured to transition the exposed surface between a first state and a second state in response to a compression force applied to the reactive element by an external ground surface in a user activity, to prevent accumulation of ground surface material compacting on the sole of the article of footwear in the user activity.

In some embodiments, the method may include providing a molding system. The molding system may include a first mold plate including a first mold cavity and a second mold plate including a second mold cavity. The method may include a step of placing a first piece of mold material in between the first mold plate and the second mold plate in a position adjacent to the first mold cavity. The method may include a step of placing a second piece of mold material in between the first mold plate and the second mold plate in a position adjacent to the second mold cavity. The method may include a step of pressing the first mold plate and the second mold plate together. The method may include a step of suctioning air from first mold cavity such that the first piece of mold material is drawn into the first mold cavity. The method may include a step of suctioning air from second mold cavity such that the second piece of mold material is drawn into the second mold cavity. The method may include a step of applying heat to both the first mold plate and the second mold plate to mold the first piece of mold material and the second piece of mold material into a resilient element having a dome shaped portion formed by the first piece of mold material, a flat portion formed by the second piece of mold material, and a webbing formed by both the first piece of mold material and the second piece of mold material, the webbing having at least one tab. The method may include a step of attaching the resilient element to the lower surface of the sole such that the flat portion of the resilient element lies against the lower surface of the sole.

In some embodiments, the step of attaching the resilient element to the lower surface of the sole may include placing a shaft of a cleat through a hole on the tab of the webbing of the resilient element and attaching the shaft of the cleat to the lower surface of the sole.

In some embodiments, the step of attaching the resilient element to the lower surface of the sole includes molding the resilient element to the lower surface of the sole.

Other systems, methods, features and advantages of the invention will be, or will become, apparent to one of ordinary skill in the art upon examination of the following figures and detailed description. It is intended that all such additional systems, methods, features and advantages be included within this description and this summary, and within the scope of the invention, and be protected by the following claims.

Figure 2:
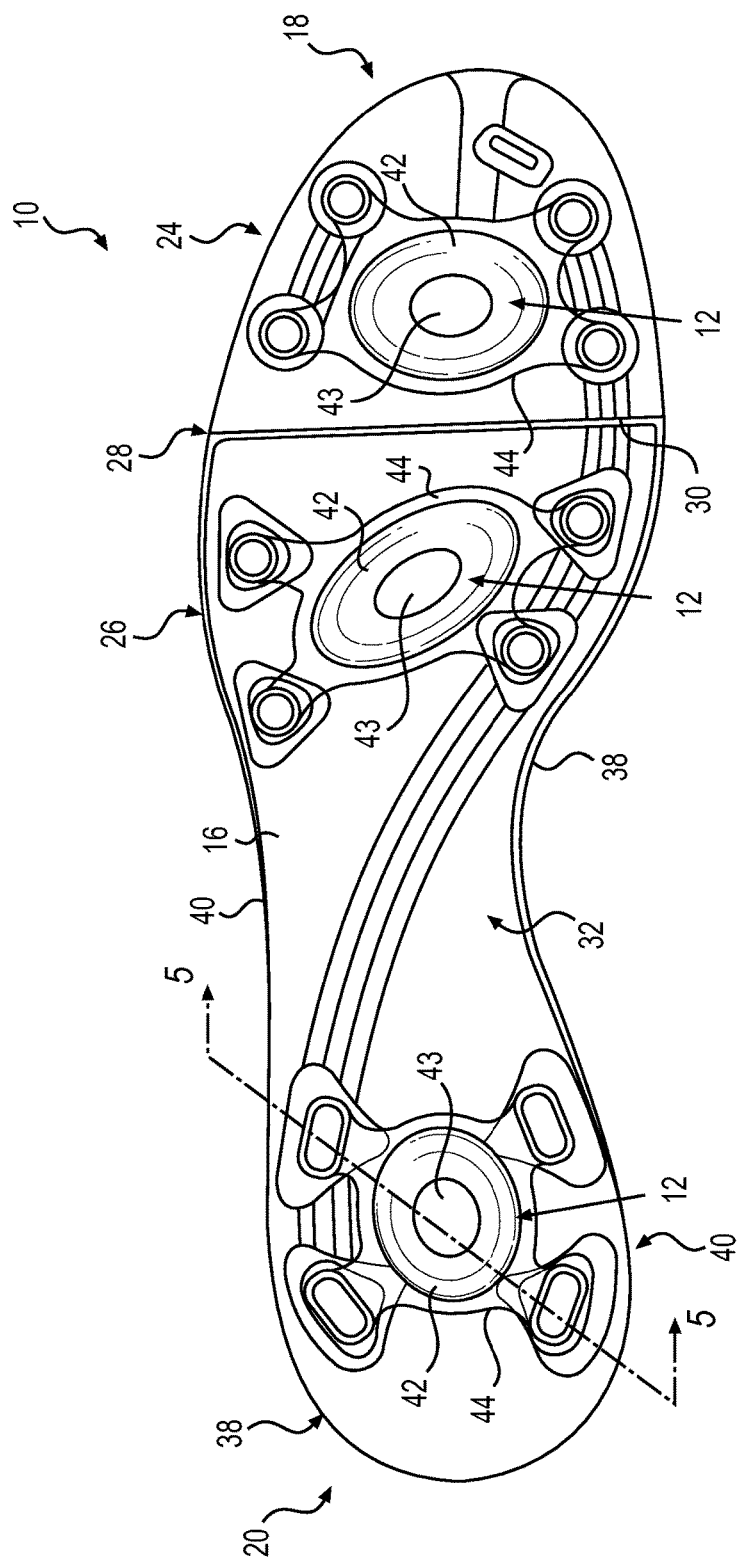
FIG. 2 is a plan view of an embodiment of a lower surface of the article of footwear of FIG. 1 illustrating a configuration of ground surface material accumulation prevention structure.
Figure 3:
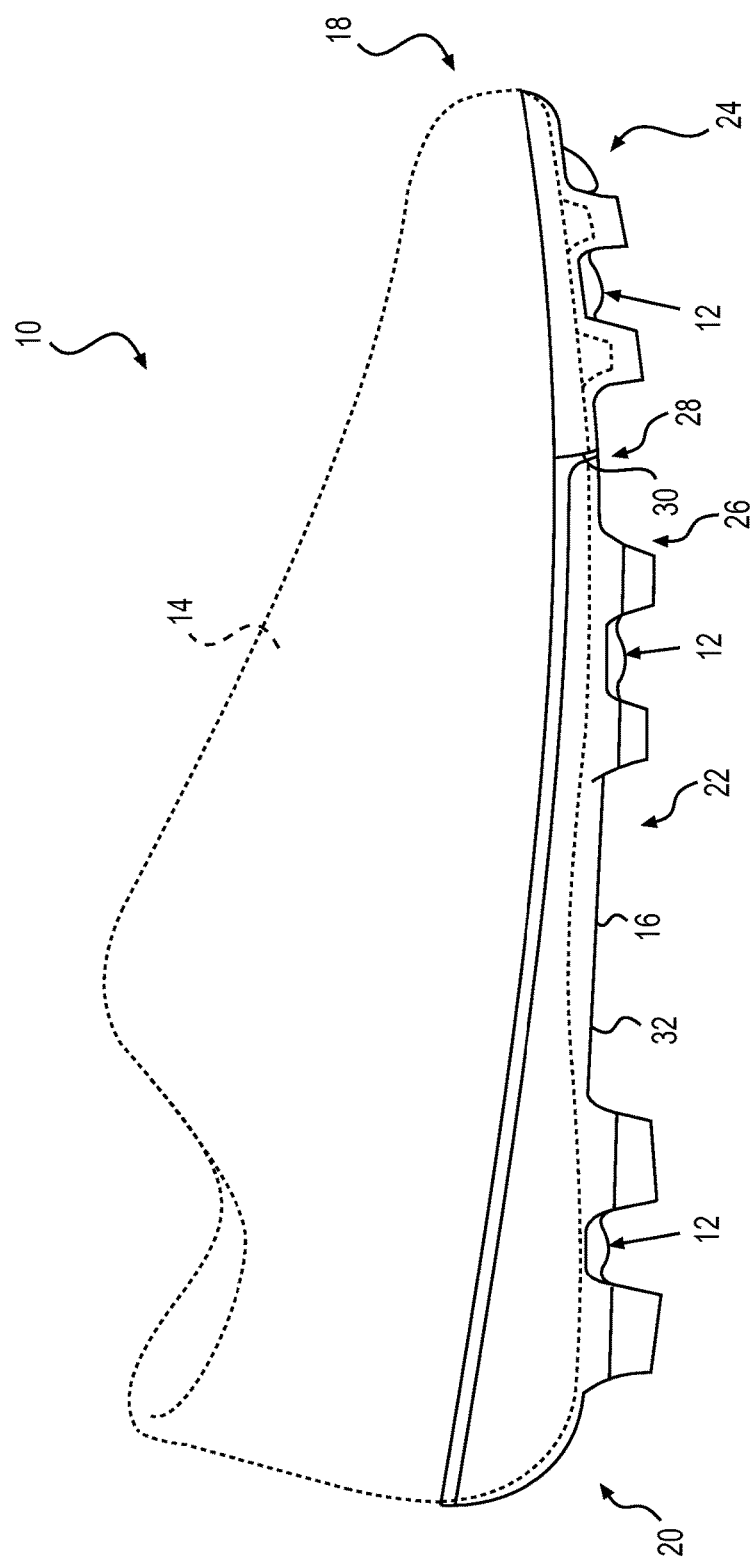
FIG. 3 is a side profile view of the article of footwear of FIGS. 1 and 2.

FIGS. 1-3 illustrate an embodiment of an article of footwear including ground surface material accumulation prevention structure according to the present invention. FIG. 1 is a perspective view of an embodiment of an article of footwear 10 including ground surface material accumulation prevention structure 12 according to the present invention. FIG. 2 is a plan view of a lower surface of a sole, or sole plate, of the article of footwear of FIG. 1. FIG. 3 is a side profile view of the article of footwear of FIG. 1. FIGS. 1-3 illustrate an embodiment of a configuration of the article of footwear 10 and ground surface material accumulation prevention structure 12. Those skilled in the art readily will appreciate alternative embodiments in view of the present disclosure.

Generally, the term "sole," "sole plate," or "cleated sole plate" as used in this detailed description and throughout the claims includes an element configured to be disposed as an outsole for an article of footwear that includes one or more ground surface traction element. A sole may take the form of an outsole or a sole structure for any article of footwear including, but not limited to: soccer shoes, baseball shoes, hiking boots, football shoes, sneakers, rugby shoes, basketball shoes, track shoes, snow shoes, as well as other kinds of shoes. In an exemplary embodiment, a sole may comprise essentially an entirety of an outsole of an article of footwear. In other embodiments, a sole may comprise a portion of an outsole of an article of footwear, including, but not limited to one or more of a forefoot region, a midfoot region, and/or a heel region. In other embodiments, different configurations of a sole may be included in an article of footwear. For purposes of illustration, in various embodiments herein a sole is shown in isolation. In other embodiments, however, the sole could be associated with an upper for an article of footwear.

As shown in FIGS. 1-3, in some embodiments article of footwear 10 may include an upper 14 and a sole or sole plate 16. Upper 14 may be any known or later developed upper structure or design. Those skilled in the art readily will be able to select a structure and design for the upper 14 suitable for a desired type of article of footwear 10 and intended use.

Sole or sole plate 16 may be any known or later developed sole structure and design suitable for a desired article of footwear 10 having ground surface material accumulation prevention structure 12 of the present invention. Sole 16 may include one or more layers, including inner and/or midsole structures (not shown), made of known or later developed material(s) suitable for a desired use or activity. Sole plate 16 may include ground surface traction elements 17 suitable for an intended use or activity of the article of footwear 10. In some embodiments the ground surface traction elements 17 may include fixed or removable cleats or studs. In some embodiments a ground surface traction element 17 may locate, support, and/or secure ground surface material accumulation prevention structure 12 relative to the sole 16 of the article of footwear 10. Those skilled in the art readily will be able to select a structure, design, material(s), and construction for the sole 16, including a number and configuration of ground surface traction elements 17, suitable for a desired type of article of footwear 10 and intended use.

Article of footwear 10 may include a forefoot region 18 (distal end), a heel region 20 (proximal end) opposite forefoot region 18, and a midfoot region 22 disposed between forefoot region 18 and heel region 20. Forefoot region 18 may include a toe region 24 (most distal end) and a balls of foot region 26 disposed adjacent the toe region 24. Forefoot region 18 may include a flex region 28 located between the toe region 24 and the balls of foot region 26 that facilitates flexion of the user's toes relative to the foot in active use of the article of footwear 10. As shown in FIGS. 1-3, in some embodiments the flex region 28 may include a sipe 30 formed in a lower surface 32 of the article of footwear 10, extending in a medial/lateral direction, to facilitate flexion. Midfoot region 22 may be located between the forefoot region 18 and the heel region 20, and may include a shank and/or arch region of the article of footwear 10. As used herein, the terms forefoot region 18, heel region 20, midfoot region 22, toe region 24, balls of foot region 26, and flex region 28 refer to general areas or regions and not to particularly defined structures or boundaries. Those skilled in the art readily will appreciate alternative versions of structures, areas, and regions described herein in view of the context discussed herein.

Article of footwear 10 may include a medial portion 34 and a lateral portion 36 opposite medial portion 34. Medial portion 34 may include a medial side of the article of footwear 10, including a medial edge 38. Lateral portion 36 may include a lateral side of the article of footwear 10, including a lateral edge 40.

Ground surface material accumulation prevention structure 12 may be disposed on a lower surface 32 of sole 16. Ground surface material accumulation prevention structure 12 may include a reactive element 42 having an exposed surface. In some embodiments, reactive element 42 optionally may have an exposed friction wear surface 43. In some embodiments, ground surface material accumulation prevention structure 12 may include webbing 44 for locating, supporting, and/or securing the reactive element 42 on the lower surface 32 of sole 16. In some embodiments, webbing 44 may include one or more tabs 46. In some embodiments, a tab 46 may be associated with a ground surface traction element 17 to locate, support, and/or secure ground surface material accumulation prevention structure 12 to the lower surface 32 of sole 16 relative to the ground surface traction element 17. Those skilled in the art readily will be able to select a design and configuration of ground surface material accumulation prevention structure 12, including webbing 44, suitable for a desired configuration of an article of footwear 10 and its intended use.

Figure 4:
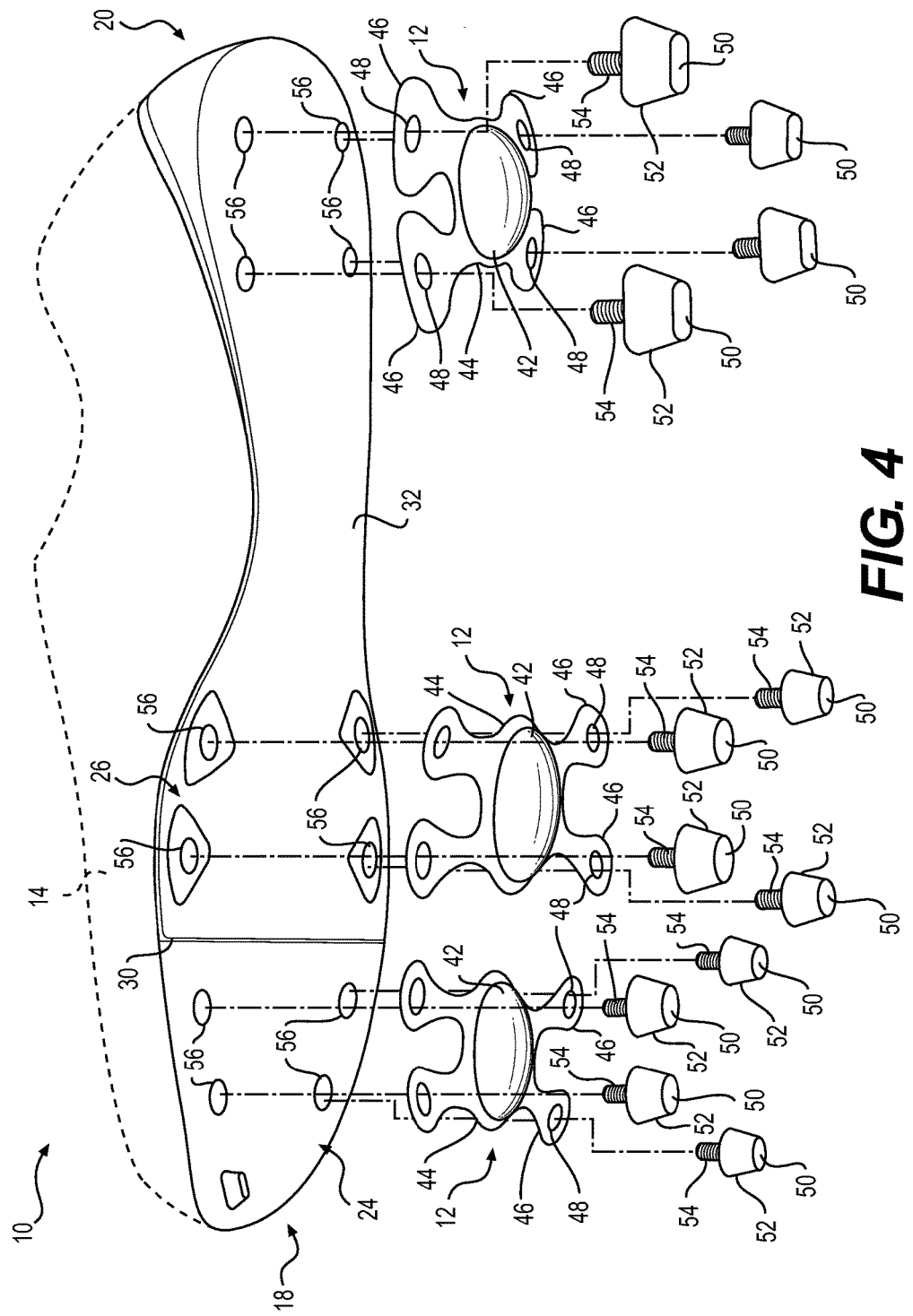
FIG. 4 is an exploded perspective view of an embodiment of the article of footwear of FIGS. 1-3, illustrating an embodiment of ground surface material accumulation prevention structure according to the present invention.

FIG. 4 is an exploded perspective view of an embodiment of the article of footwear 10 of FIGS. 1-3, illustrating an embodiment of ground surface material accumulation prevention structure 12 for the article of footwear. As shown in FIG. 4, in some embodiments sole 16 of the article of footwear 10 may include plural removable cleats or studs 50 (ground surface traction elements 17). Each removable cleat 50 may include a head 52 configured to contact an external ground surface and a connector 54 configured to removably secure the cleat 50 to the lower surface 32 of sole 16. Each head 52 may have a configuration (size, shape, depth, width, length, orientation, etc.) selected for a desired application and intended use of the article of footwear 12. Exemplary shapes for ground surface traction elements 17, including removable cleats 50 include, but are not limited to, rectangular, hexagonal, cylindrical, conical, circular, square, trapezoidal, diamond, ovoid, as well as other regular or irregular and geometric or non-geometric shapes. Those skilled in the art readily will be able to select a shape and/or configuration of each ground surface traction element 17 or cleat 50, including a configuration of a cluster of plural ground surface traction elements 17, based on a desired application or use of the article of footwear 10. As shown in FIG. 4, in some embodiments each connector 54 may be threaded and configured to screw into a female threaded connector 56 in the lower surface 32 of sole 16. Those skilled in the art readily will appreciate alternative connector structures and configurations for removably securing cleat 50 to the lower surface 32 of sole 16 of the article of footwear 10.

As shown in FIG. 4, in some embodiments article of footwear 10 may include three ground surface material accumulation prevention structures 12. One structure may be disposed in the toe area 24. One structure may be disposed in the ball of foot area 26 of the forefoot area 18. One structure may be disposed in the heel area 20. The number and location of ground surface material accumulation prevention structures 12 is exemplary only. As discussed herein, a localized and overall configuration may provide a desired localized and overall ground surface material accumulation prevention function for the article of footwear 10.

As shown in FIG. 4, in some embodiments a ground surface material accumulation prevention structure 12 may be located within a cluster of ground surface traction elements 17. In the embodiment of FIG. 4, each ground surface material accumulation prevention structure 12 may include webbing 44 having at least one tab 46. A tab 46 may be associated with a respective ground surface traction element 17. A tab 46 may include structure configured for engaging a ground surface traction element 17 of the article of footwear 10. For example, as shown in FIG. 4, in some embodiments each tab 46 may include a through-hole 48 sized and configured to receive a male connector 54 of a removable cleat 50 to secure the tab 46 and ground surface material accumulation prevention structure 12 to the lower surface 32 of sole 16 of the article of footwear 10.

As shown in FIGS. 1-4, in some embodiments a cluster may include four ground surface traction elements 17. However, it will be appreciated that a cluster may include a different number of ground surface traction elements 17, and that a ground surface traction element 17 may be included in more than one cluster. The number and configuration of ground surface traction elements 17 may vary based on a number of factors, including a size and intended use of the article of footwear 10 and a size, material, and configuration of ground surface traction elements 17. Those skilled in the art readily will be able to select a number and configuration of ground surface traction elements 17 suitable for a desired article of footwear 10 and intended use.

Figure 5:
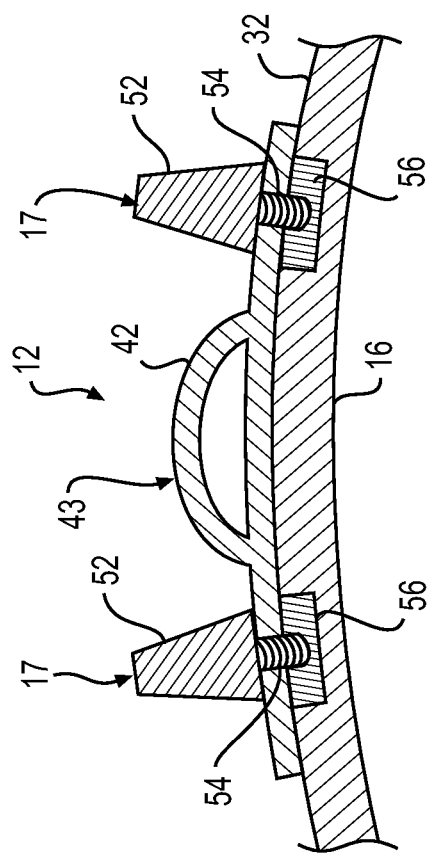
FIG. 5 is a cross-sectional view of an embodiment of the ground surface material accumulation prevention structure of FIG. 4 taken along section line 5-5 of FIG. 2.

FIG. 5 is a cross-sectional view of an embodiment of a ground surface material accumulation prevention structure 12 of FIG. 4 taken along section line 5-5 of FIG. 2. As shown in FIG. 5, in some embodiments ground surface material accumulation prevention structure 12 may be removably secured to a lower surface 32 of sole 16 by removable studs 50. Each stud 50 may include a threaded male connector 54 that may be inserted through a through-hole 48 of a tab 46 of webbing 44 of the ground surface material accumulation prevention structure 12, where threaded male connector 54 may be screwed into a female threaded connector 56 embedded in sole 16 to removably secure the ground surface material accumulation prevention structure 12 to the lower surface 32 of sole 16. In this manner, ground surface material accumulation prevention structure 12 may be securely supported against the lower surface 32 of sole 16. This configuration may prevent ground surface material from entering and accumulating in a gap at an interface between the ground surface material accumulation prevention structure 12 and the lower surface 32 of sole 16. As shown in FIG. 5, in some embodiments article of footwear 10 may include a rigid sole plate 16 and a relatively soft inner sole or liner layer 501, with at least a portion of ground surface material accumulation prevention structure 12 disposed below rigid sole plate 16.

Figure 7:
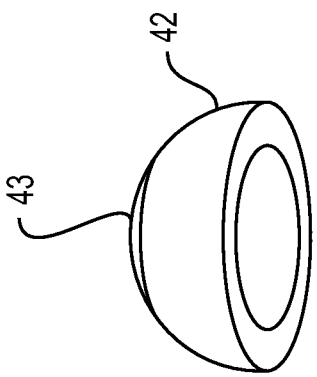
FIG. 7 is a perspective view of the reactive element of FIG. 6.
Figure 6:
FIG. 6 is a profile view of an embodiment of a reactive element of the ground surface material accumulation prevention structure of FIG. 5.

FIG. 6 is a side profile view illustrating an embodiment of a reactive element 42 of ground surface material accumulation prevention structure 12, and FIG. 7 is a perspective view of the reactive element 42 of FIG. 6. As shown in FIGS. 6 and 7, in some embodiments, reactive element 42 may be dome shaped. As shown in FIGS. 6 and 7, in some embodiments, reactive element 42 optionally may include a friction wear treatment surface 43. Friction wear treatment surface 43 may be disposed in a location and configured to contact an external ground surface in active use of the article of footwear 10. As shown in FIGS. 6 and 7, in some embodiments, friction wear treatment surface 43 may be located on a crest of a dome-shaped reactive element 42.

Reactive element 42 may be configured to react in response to an externally applied compression force in active use of the article of footwear 10. Reactive element 42 may be configured to collapse in response to a compression force applied to an exposed surface of the reactive element 42 by an external ground surface, to absorb and store a portion of energy from the applied compression force, and to generate therein a reactive force that biases the reactive element 42 to return to a non-collapsed state upon release of the applied compression force. In some embodiments reaction element 42 may be configured to immediately and/or continuously return to a non-compressed state in response to release of a compression force. In some embodiments, the reactive element 42 may be configured to 'pop' back from a compressed state to a non-compressed state in response to release of an external compression force.

Reactive element 42 may have any geometric shape that provides a desired reactive functional characteristic. As shown in FIGS. 6 and 7, in some embodiments, reactive element 42 may have a hollow semi-spherical dome shape. This configuration may provide a reactive functional characteristic that is substantially consistent regardless of a direction in which an external compression force is applied to the reactive element, e.g., based on an orientation of the article of footwear 10 upon impact with a ground surface. In some embodiments, reactive element 42 may have a multi-faceted dome shape. In some embodiments, reactive element 42 may have a symmetrical or non-symmetrical shape.

Reactive element 42 may have a base plan shape or footprint selected for a particular article of footwear configuration or application. In some embodiments, reactive element 42 may have a base plan shape or footprint configured for location in a particular area of the article of footwear 10. As shown in FIGS. 1-4, in some embodiments reactive element 42 may be sized and shaped for location between a cluster of ground surface traction elements 17 in a selected one of the toe region 24 or balls of foot region 26 of the forefoot region 20, or in the heel region 20.

Reactive element 42 may be configured to provide a reactive force/functional characteristic in a selected direction. Reactive element 42 may be configured to provide a reactive force/functional characteristic in a direction associated with a location of the ground surface material accumulation prevention structure 12 on the article of footwear 10. For example, reactive element 42 may be located in the toe region 24 and configured to generate a reactive force/functional characteristic that acts in a proximal direction relative to the heel region 20.

FIG. 8 is a cross-sectional view of a second embodiment of a ground surface material accumulation prevention structure 12 of FIG. 4 taken along section line 5-5 of FIG. 2. Similar to FIG. 5, as shown in FIG. 8, in some embodiments ground surface material accumulation prevention structure 12 may be removably secured to a lower surface 32 of sole 16, e.g., by removable studs 50. As shown in FIG. 8, in some embodiments reactive element 42 may have an elongated dome shape, e.g., that has an axis that extends in a direction between opposing ground surface traction elements 17 (e.g., studs 50). This configuration may provide a ground surface material accumulation prevention structure having a size and shape that conforms to a desired location on the article of footwear (e.g., in the heel region 20), and/or conforms with a location and configuration of sole 16, including a configuration of ground surface traction elements 17.

As shown in FIGS. 8-10, in some embodiments ground surface material accumulation prevention structure 12 may have a multi-piece construction. As shown in FIG. 8, in some embodiments ground surface material accumulation prevention structure 12 may include a base portion formed by webbing 44 and a separate reactive element 42. In some embodiments reactive element 42 may be separately pre-molded and then fixed to webbing 44. For example, in some embodiments reactive element 42 may be fixed to webbing 44 by a bonding or molding process. In some embodiments, reactive element 42 may be removably secured to webbing 44. As shown in FIG. 8, in some embodiments base webbing 44 may include a generally annular flange 45, and reactive element 42 may have a hollow dome shape including an annular flange 47 that mates with flange 45 of base webbing 44. As shown in FIGS. 8 and 10, in some embodiments annular flange 45 of base webbing 44 may face radially outward, and annular flange 47 may be formed on an inner facing surface of hollow dome-shaped reactive element 42. Alternatively, in some embodiments annular flange 45 of base webbing 44 may face radially inward, and annular flange 47 may be formed on an outer perimeter surface of the hollow dome-shaped reactive element 42. In each case, reactive element 42 and base webbing 44 may be made of different materials, e.g., made from different mold materials by respective pre-molding processes. In some embodiments, base webbing 44 may be integrally formed with sole 16 of the article of footwear 10, e.g., by a bonding or molding process. In the case of a removable reactive element 42, this configuration may enable a user to apply, remove, or replace, a ground surface material accumulation prevention structure 12 during active use of the article of footwear 10, e.g., during a soccer game.

Figure 11:
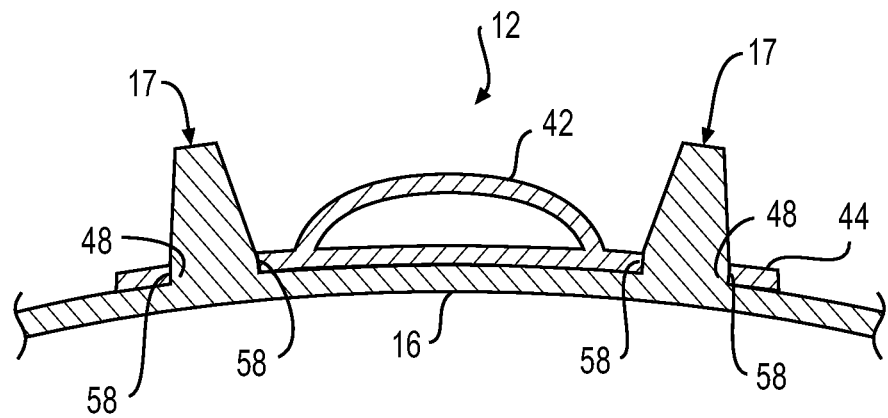
FIG. 11 is a cross-sectional view of a third embodiment of a ground surface material accumulation prevention structure of FIGS. 1-3 taken along section line 5-5 of FIG. 2.

FIG. 11 is a cross-sectional view of a third embodiment of a ground surface material accumulation prevention structure 12 of FIGS. 1-3 taken along section line 5-5 of FIG. 2. Similar to the embodiments above, as shown in FIG. 11, in some embodiments ground surface material accumulation prevention structure 12 may be removably secured to ground surface traction elements 17 on the lower surface 32 of sole 16 of the article of footwear 10. As shown in FIG. 11, however, in some embodiments ground surface traction elements 17 may be integrally molded with sole 16 and a tab 46 may be provided with a through-hole 48 that may be stretched over a ground surface traction element 17 to capture and engage a base portion 58 of the ground surface traction element 17. Base portion 58 of the ground surface traction element 17 may be formed with an undercut or angled surface that biases an edge of the through-hole 48 of the tab 46 to securely remain at the base portion 58. In this manner, base webbing 44 may be securely supported against the lower surface 32 of sole 16. This configuration may facilitate preventing ground surface material from penetrating into a gap at an interface between the base webbing 44 and sole 16.

Figure 12:
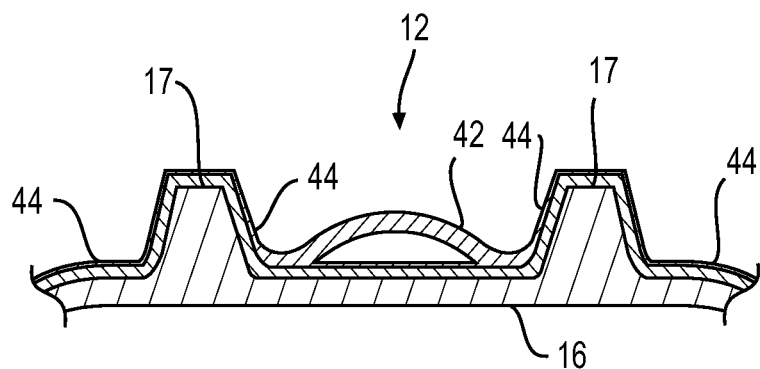
FIG. 12 is a cross-sectional view of a fourth embodiment of a ground surface material accumulation prevention structure of FIGS. 1-3 taken along section line 5-5 of FIG. 2.

FIG. 12 is a cross-sectional view of a fourth embodiment of a ground surface material accumulation prevention structure 12 of FIGS. 1-3 taken along section line 5-5 of FIG. 2. As shown in FIG. 12, in some embodiments ground surface material accumulation prevention structure 12 may be integrally formed with sole 16 of an article of footwear 10. In some embodiments, reactive element 42 may be integrally formed on the lower surface 32 of sole 16. In some embodiments, reactive element 42 may be integrally formed on the lower surface 32 of sole 16 by a bonding or molding process. In some embodiments, webbing 44 of the ground surface material accumulation prevention structure 12 may be integrally formed with a lower surface 32 of sole 16. In some embodiments, webbing 44 may be integrally formed with a ground surface traction element 17, e.g., by bonding or molding process. Those skilled in the art readily will appreciate alternative configurations and bonding or molding processes suitable for forming a sole 16 for an article of footwear 10 having an integral ground surface material accumulation prevention structure 12. Those skilled in the art readily will appreciate that an article of footwear 10 having integrally molded ground surface material accumulation prevention structure 12 may have utility in particular applications requiring a permanent non-clogging function.

Each of the above embodiments illustrates a feature having an alternative configuration that may have an advantage over one or more alternative embodiment(s)/configuration(s) in a particular application.

Figure 13:
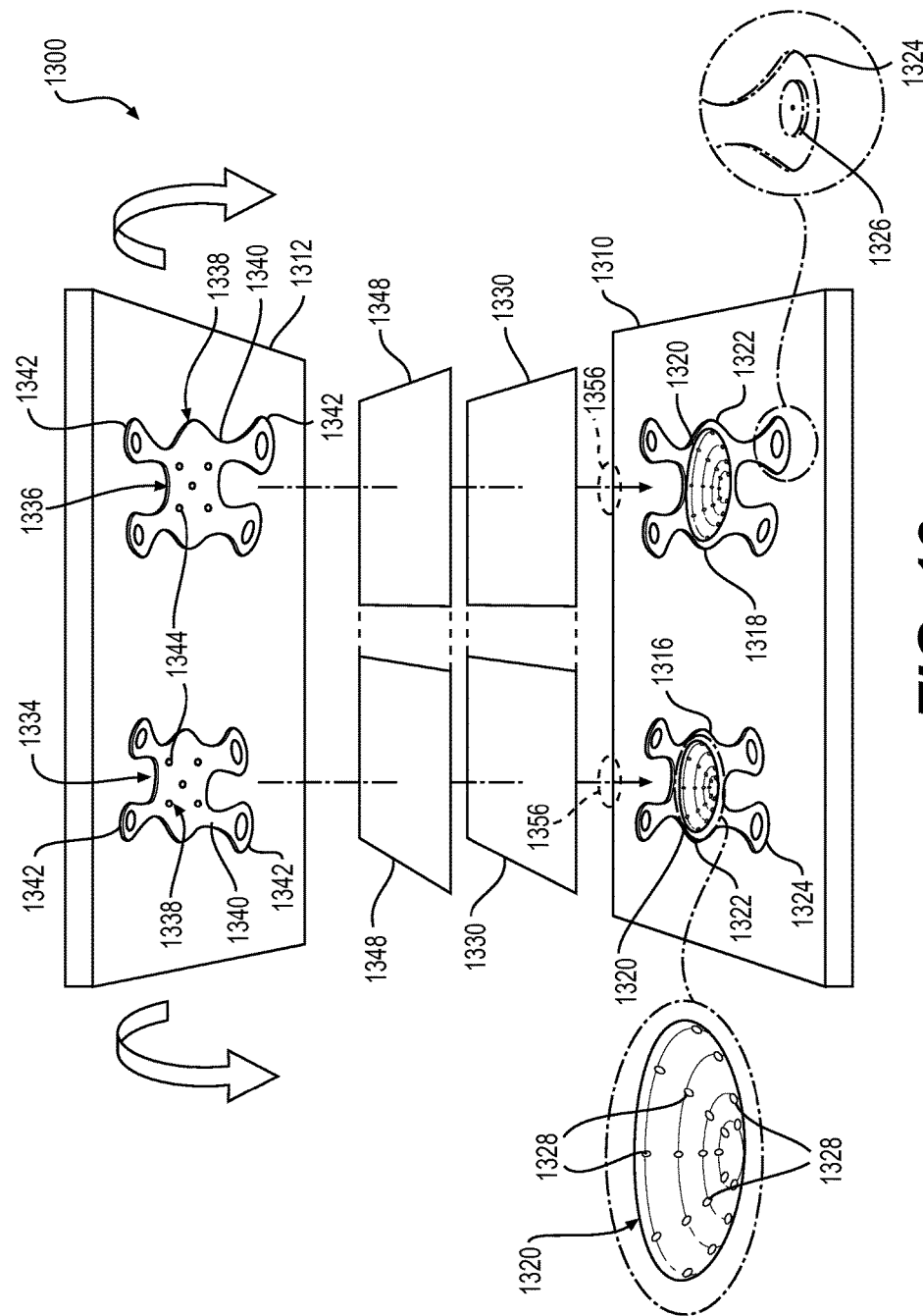
FIG. 13 is an exploded view of an embodiment of a molding system for making a ground surface material accumulation prevention structure (open state), including an enlarged view of a mold surface of a reactive element and a mold surface of a webbing tab of the ground surface material accumulation prevention structure.
Figure 14:
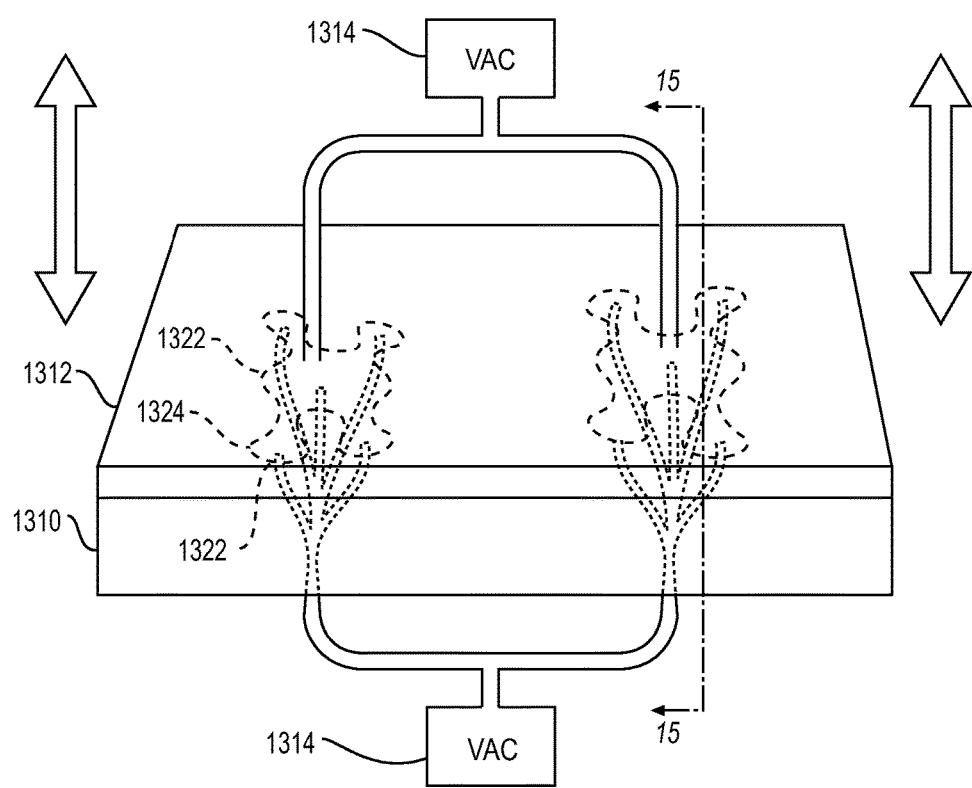
FIG. 14 is a perspective view of the molding system of FIG. 13 in a closed state, including an optional vacuum system.
Figure 15:
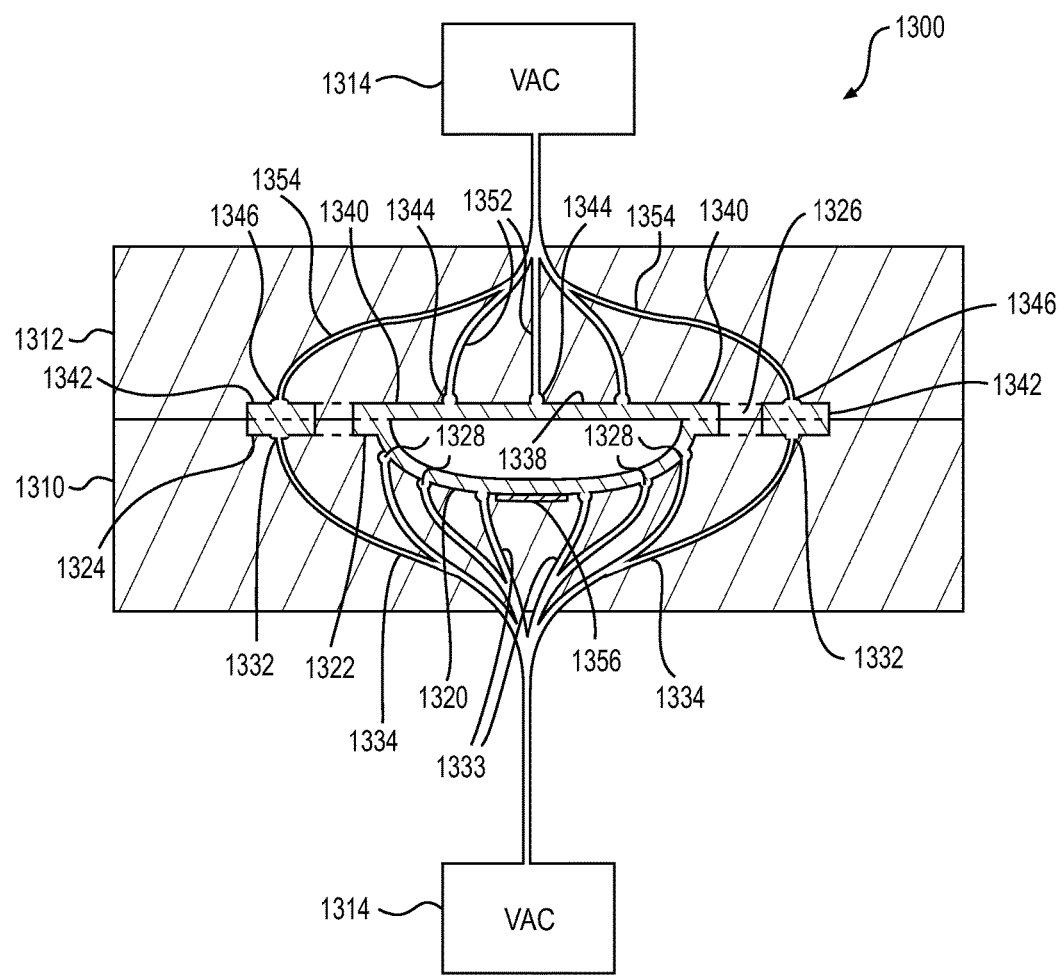
FIG. 15 is a cross-sectional view taken along section line 15-15 of FIG. 14, illustrating an embodiment of a vacuum system configuration for the molding system of FIGS. 13-14.

Molding System for Molding Independent Ground Surface Material Accumulation Prevention Structure FIGS. 13-15 illustrate an embodiment of a molding system 1300 for molding ground surface material accumulation prevention structure 12 of the present invention. FIG. 13 schematically illustrates an embodiment of molding system 1300 in an exploded, open mold configuration. FIG. 14 schematically illustrates molding system 1300 in a closed mold configuration optionally including a vacuum system. And FIG. 15 is a sectional view of molding system 1300 taken along section line 15-15 of FIG. 14, illustrating in cross-section a molded ground surface material accumulation prevention structure 12.

In some embodiments a molding system may mold individual, independent ground surface material accumulation prevention structures suitable for use with an article of footwear having plural ground surface traction elements arrange in a duster. In some embodiments, one or more ground surface traction elements may be removably attached to the lower surface of the sole of the article of footwear. As shown in FIGS. 13-15, in some embodiments molding system 1300 may be used to mold ground surface material accumulation prevention structure 12 suitable for use with an article of footwear 10 having plural removable cleats or studs 50 (see, e.g., FIGS. 4-7).

As shown in FIGS. 13-15, in some embodiments molding system 1300 may include a lower mold plate 1310, an upper mold plate 1312, and an optional vacuum system 1314. In some embodiments, molding system 1300 may include one or more components typically associated with a compression or thermal molding system, including components not described herein.

Lower mold plate 1310 may include at least one lower mold cavity for molding ground surface material accumulation prevention structure. As shown in FIGS. 13-15, in some embodiments lower mold plate 1310 may include first lower mold cavity 1316 and second lower mold cavity 1318 for molding respective first and second ground surface material accumulation prevention structures 12. In some embodiments lower mold cavity 1316 may include a central dome-shaped recess portion 1320 and a lower webbing recess portion 1322 that may include at least one lower tab recess portion 1324. As shown in FIGS. 13-15, in some embodiments, lower webbing cavity portion 1322 may include four lower tab recess portions 1324. In some embodiments, each lower tab recess portion 1324 may include a raised lower central portion 1326 configured to form a through-hole in a tab 46 of a molded ground surface material accumulation prevention structure 12.

Lower mold plate 1310 optionally may include vacuum system elements for facilitating a molding process. As shown in FIGS. 13-15, in some embodiments central dome-shaped recess portion 1320 may include one or more dome vacuum ports 1328. In some embodiments, dome vacuum ports 1328 may be arranged in a pattern on a mold surface of the central dome-shaped recess portion 1320 suitable for drawing a first (lower) sheet of mold material 1330 into the central dome-shaped recess portion 1320 and onto a contour of the mold surface of the central dome-shaped recess portion 1320 in a molding process. In some embodiments, lower webbing recess portion 1322 may include lower webbing recess vacuum ports 1332 configured to draw the first (lower) sheet of mold material 1330 to a mold surface of the lower webbing recess portion 1322, e.g., to a mold surface of lower tab recess portion 1324, in a molding process. As shown in FIGS. 13-15, in some embodiments lower mold plate 1310 may include a lower vacuum manifold structure 1333 connecting the dome vacuum ports 1328 and lower webbing recess ports 1332 to a central vacuum source of vacuum system 1314.

Upper mold plate 1312 may include at least one upper mold cavity for molding a ground surface material accumulation prevention structure. As shown in FIGS. 13-15, in some embodiments upper mold plate 1312 may include a first upper mold cavity 1334 corresponding to first lower mold cavity 1316 and a second upper mold cavity 1336 corresponding to lower mold cavity 1318. In some embodiments first upper mold cavity 1334 may include a central base recess portion 1338 and an upper webbing recess portion 1340 that may include at least one upper tab recess portion 1342. As shown in FIGS. 13-15, in some embodiments upper webbing recess portion 1340 may include four upper tab recess portions 1342 corresponding to the four lower tab recess portions 1324.

Upper mold plate 1312 optionally may include vacuum system elements for facilitating a molding process. As shown in FIGS. 13-15, in some embodiments central base recess portion 1338 may include one or more central base vacuum ports 1344 configured to hold a second (upper) sheet of mold material 1348 to a mold surface of the central base recess portion 1338 in a molding process. In some embodiments upper webbing recess portion 1340 may include upper webbing recess vacuum ports 1350 configured to draw second (upper) sheet of mold material 1348 to a mold surface of upper webbing recess portion 1342, e.g., to a mold surface of upper tab recess portion 1342. As shown in FIGS. 13-15, in some embodiments upper mold plate 1312 may include an upper vacuum manifold structure 1352 connecting the central base recess portion vacuum ports 1344 and upper webbing recess ports 1346 to a central vacuum source of vacuum system 1314.

In a molding process of FIGS. 13-15, first (lower) sheet of molding material 1330 and second (upper) sheet of molding material 1348 may be disposed between the lower mold plate 1310 and the upper mold plate 1312 in registration with the at least one lower mold cavity (1316, 1318) and at least one upper mold cavity (1334, 1336). As shown in FIG. 13, the first (lower) sheet of mold material may be a single sheet or plural sheets, e.g., corresponding in number to the number of mold cavities in the molding system 1300. For example, in the molding system of FIGS. 13-15 the number of first (lower) sheets of mold material 1330 may be two. Similarly, the second (upper) sheet of mold material may be a single sheet or plural sheets, e.g., corresponding in number to the number of mold cavities in the molding system 1300. For example, in the molding system of FIGS. 13-15 the number of second (upper) sheets of mold material 1348 may be two.

The molding process optionally may include a layer of wear resistant surface material. As shown in FIG. 13, in some embodiments an optional wear resistant surface treatment material 1356 may be disposed between the first (lower) sheet of molding material 1330 and the lower mold plate 1310 so that the wear resistant surface treatment material 1356 is in registration with a central area of the central dome recess portion 1320. In this manner, a molded reactive element 42 may be formed with a friction wear resistance surface 43 configured to contact an external ground surface.

The molding process may include a heat treatment and/or pressure treatment process, optionally with vacuum. In some embodiments, in the molding process the first (lower) sheet of mold material 1330 may be drawn by vacuum into the lower mold cavity (1316, 1318) and take a shape and configuration conforming to the shape and configuration of a mold surface of the lower mold cavity (1316, 1318); the second (upper) sheet of mold material 1348 may be drawn by vacuum into the upper mold cavity (1334, 1336) and take a shape and configuration conforming to the shape and configuration of a mold surface of the upper mold cavity (1334, 1336). In some embodiments, optional wear surface treatment material 1356 may be drawn into the lower mold cavity in registration with a central area of the central dome recess portion 1320. In some embodiments, in a molding process first (lower) sheet of mold material 1330, second (upper) sheet of mold material 1348, and optional wear surface treatment material 1356 may be molded together to form a molded ground material accumulation prevention structure 12 having an integral/unitary structure. The method of making an article of footwear, including a molding process, is discussed in more detail below.

FIG. 15 is a cross-sectional view taken along section lines 15-15 of FIG. 14 illustrating in cross-section a molded ground surface material accumulation prevention structure 12 product of molding system 1300, in situ. The molding system may be opened to remove the molded ground material accumulation prevention structure 12 product. In some embodiments, any extra mold material formed on the molded product may be removed (e.g., cut) from the molded product prior to securing the ground surface material accumulation prevention structure 12 to an article of footwear, e.g., using removable cleats 50 (see, e.g., FIGS. 1-4).

Mold materials for a molding process in the molding system of FIGS. 13-15 may be any known or later developed molding materials suitable for a desired ground material accumulation prevention structure. In some embodiments, the molding material may be a plastic material. In different embodiments, however, various types of molding material may be used to form a ground surface material accumulation prevention structure using molding system 1300. In some embodiments, the molding material may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as the molding material. In addition, in some embodiments a ground surface material accumulation prevention structure may be produced using more than one molding material.

As shown in FIGS. 13-15, in some embodiments the mold material may be in the form of a sheet of mold material. In some embodiments first (lower) sheet of mold material 1330, second (upper) sheet of mold material 1348, and optional wear resistant surface treatment material 1356 may be different mold materials. In some embodiments, the mold material may be pre-formed or pre-cut to form a mold material blank. In some embodiments, a mold material blank may be sized and configured to correspond to a mold cavity (1316,1318) of the molding system. Those skilled in the art readily will be able to select various combinations of mold materials suitable for a particular application.

Figure 16:
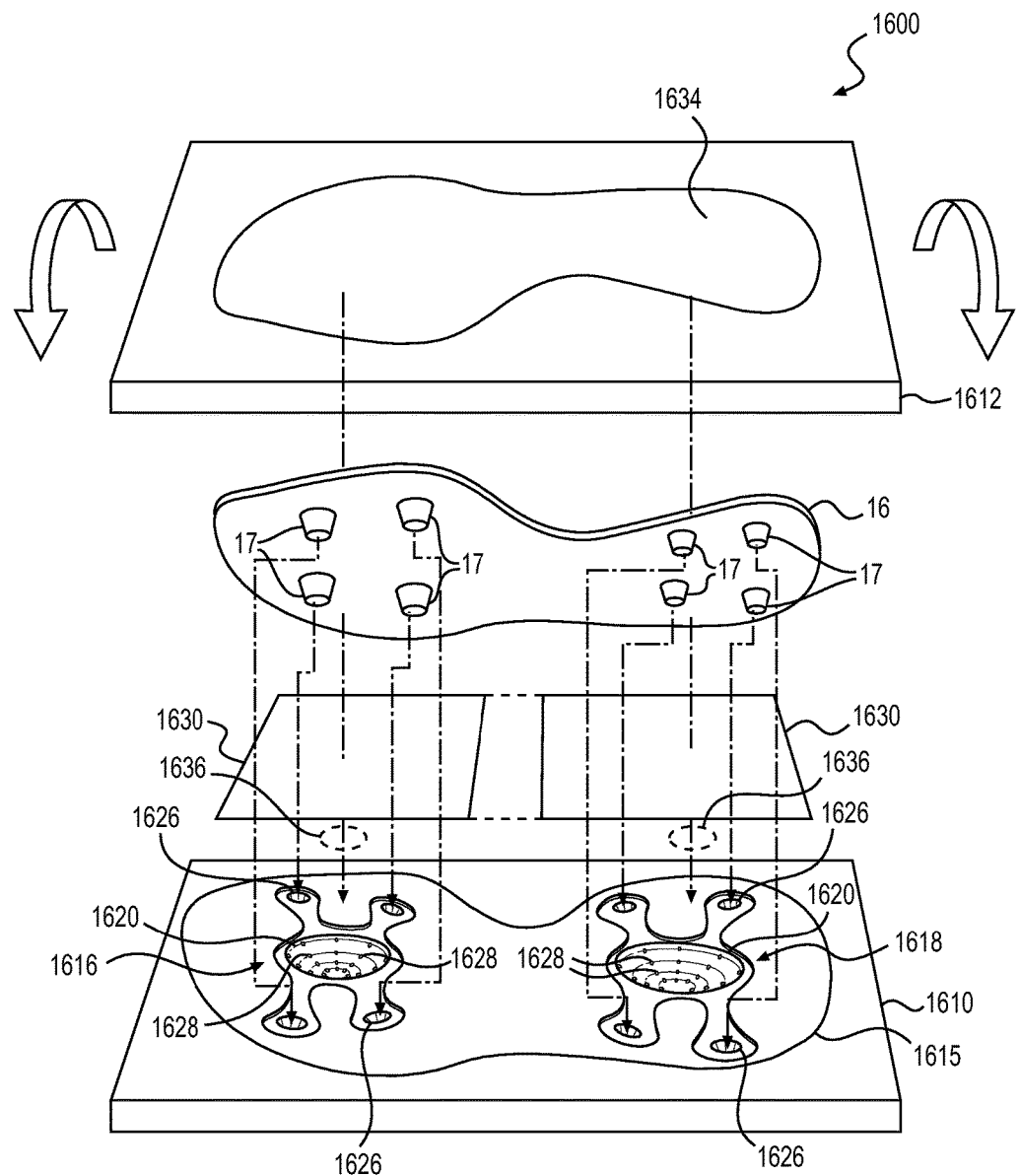
FIG. 16 is an exploded view of an embodiment of a molding system for making a sole plate having integral ground surface material accumulation prevention structure (open state).
Figure 17:
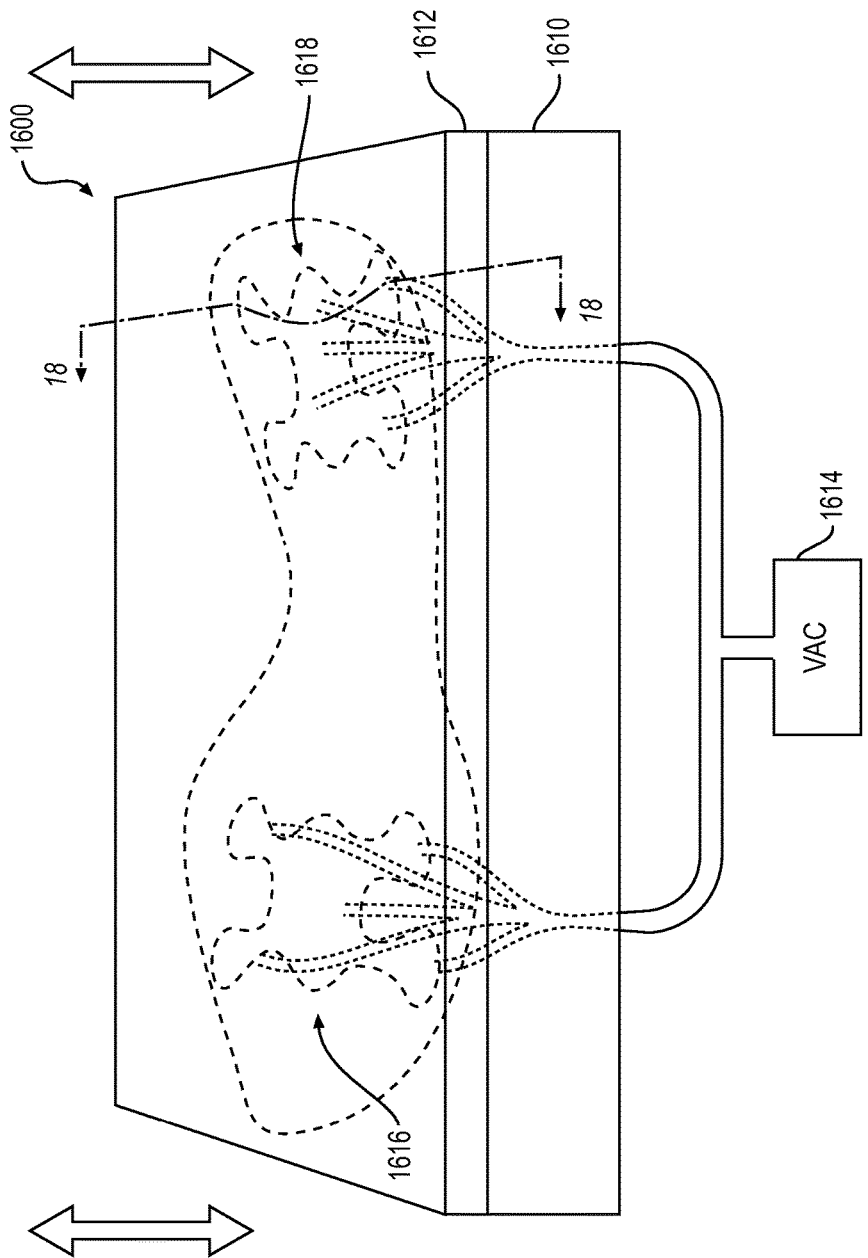
FIG. 17 is a schematic perspective view of an embodiment of the molding system of FIG. 16 in a closed state, including an optional vacuum system.
Figure 18:
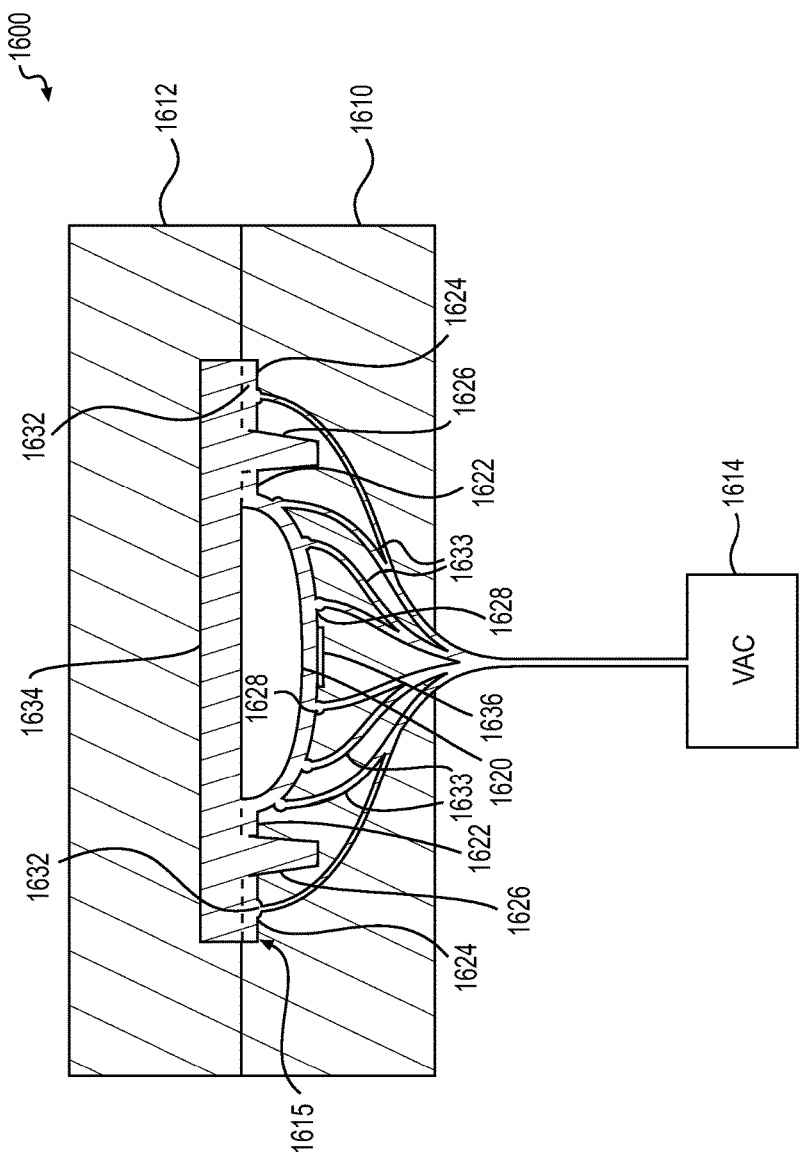
FIG. 18 is a cross-sectional view of the molding system of FIG. 17 taken along section line 18-18 of FIG. 17, illustrating an embodiment of a vacuum system configuration for the molding system of FIGS. 16-17.

Molding System for Molding Integral Sole Plate and Ground Surface Material Accumulation Prevention Structure FIGS. 16-18 illustrate an embodiment of a molding system for molding a sole plate for an article of footwear, where the sole plate includes an integral ground surface material accumulation prevention structure. FIG. 16 schematically illustrates an embodiment of molding system 1600 in an exploded, open mold configuration. FIG. 17 schematically illustrates an embodiment of molding system 1600 in a closed mold configuration, optionally including a vacuum system. And FIG. 18 is a schematic cross-sectional view of molding system 1600 taken along section line 18-18 of FIG. 17, illustrating in cross-section an embodiment of a molded sole plate including integral molded ground surface material accumulation prevention structure 12, in situ.

As shown in FIGS. 16-18, in some embodiments molding system 1600 may include a lower mold plate 1610, an upper mold plate 1612, and an optional vacuum system 1614. In some embodiments, molding system 1600 may include one or more components typically associated with a compression or thermal molding system, including components not described herein.

Lower mold plate 1610 may include a lower sole plate recess 1615 sized and configured to receive a lower surface of a sole or sole plate 16 for an article of footwear 10 and to mold ground surface material accumulation prevention structure 12 integral with sole plate 16. In some embodiments, lower mold plate 1610 (and corresponding upper mold plate 1612) may include provisions for making a matched pair of sole plates 16.

Lower mold plate 1610 may include one or more lower mold cavities formed in the lower sole plate recess 1615 and configured to mold integral ground surface material accumulation prevention structure 12. As shown in FIGS. 16-18, in some embodiments lower mold plate 1610 may include a first lower mold cavity 1616 and second lower mold cavity 1620 configured to mold respective ground surface material accumulation prevention structures 12. In the embodiment of FIG. 16, first lower mold cavity 1616 may be located in a forefoot region 18 of the lower mold plate recess 1615 and second lower mold cavity 1618 may be located in a heel region 20 of the lower mold plate recess 1615. As shown in FIGS. 16-18, in some embodiments first mold cavity 1616 may be located in registration with a first cluster of ground surface traction elements 17 in the forefoot region 18, and second mold cavity 1618 may be located in registration with a second cluster of ground surface traction elements located in the heel region 20. First lower mold cavity 1616 may include a central dome recess portion 1620 and a webbing recess portion 1622 that may include at least one tab recess portion 1624. As shown in FIGS. 16-18, in some embodiments webbing recess portion 1622 may include four tab recess portions 1624. Each tab recess portion 1624 may include a cleat recess portion 1626 configured to receive a ground surface traction element 17 of sole plate 16.

Lower mold plate 1610 may include optional vacuum system elements for facilitating a molding process. In some embodiments central dome recess portion 1620 may include one or more dome vacuum ports 1628. Dome vacuum ports 1628 may be arranged in a pattern on a mold surface of the central dome recess portion 1620 configured to draw a sheet of mold material 1630 into the central dome recess portion 1620 and onto a contour of the mold surface of the central dome recess portion 1620. In some embodiments webbing recess portion 1622 may include webbing recess vacuum ports 1632 configured to draw a sheet of mold material 1630 to a mold surface of the webbing recess portion 1622, e.g., to a mold surface of tab recess portion 1624. Lower mold plate 1610 may include a vacuum manifold structure 1633 connecting the dome vacuum ports 1628 and optional webbing recess ports 1632 to vacuum system 1614.

Upper mold plate 1612 may include an upper sole plate recess portion 1634 sized and configured to receive an upper surface of sole plate 16 of the article of footwear 10.

As shown in FIGS. 17 and 18, in some embodiments upper mold plate 1612 may include optional vacuum system elements for facilitating a molding process. In some embodiments the vacuum system may draw the sole plate 16 into upper sole plate recess portion 1634 of upper mold plate 1612.

In a molding process of FIGS. 16-18, a sole plate 16 and a sheet of mold material 1630 may be disposed between lower mold plate 1610 and upper mold plate 1620 in registration with the lower sole plate recess 1615, the upper sole plate recess 1634, and the first and second mold cavities (1616, 1618). As shown in FIG. 16, in some embodiments the sheet of mold material may be a single sheet or plural sheets corresponding in number to the number of mold cavities in the molding system 1600. For example, as shown in FIG. 16, in some embodiments the number of sheets of mold material 1630 may be two. In some embodiments an optional wear resistant surface treatment material 1636 may be disposed between the sheet of molding material 1630 and the lower mold plate 1610 so that the wear resistant surface treatment material 1636 is located in registration with a central area of the central dome recess portion 1620.

The molding process may include a heat treatment and/or pressure treatment process, optionally with vacuum. In a molding process a sheet of mold material 1630 may be drawn by vacuum into the lower mold cavity (1616, 1618) and take a shape and configuration conforming to the shape and configuration of a mold surface of the lower mold cavity (1616, 1618). The sole plate 16, the sheet of mold material 1630, and the optional wear surface treatment material 1636 may be molded together to form a molded sole plate 16 and ground surface material accumulation prevention structure 12 having an integral/unitary structure. A method of making an article of footwear, including a molding process, is discussed in more detail below.

FIG. 18 is a schematic sectional view illustrating in cross-section an embodiment of a molded sole plate with integral ground surface material accumulation prevention structure in situ. The molding system 1600 may be opened to remove the molded product. In some embodiments, any extra mold material formed on the molded product may be removed (e.g., cut) from the molded product prior to securing the sole plate to an upper to form an article of footwear.

Mold materials for a molding process in the molding system of FIGS. 16-18 may be any known or later developed molding materials suitable for a desired ground surface material accumulation prevention structure. In some embodiments the mold material may be a thermoforming or thermosetting material. As shown in FIGS. 16-18, in some embodiments the mold material may be in the form of a sheet of mold material. In some embodiments, the molding material may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as the molding material. In some embodiments the sheet of mold material 1630 and optional wear resistant surface treatment material 1336 may be different mold materials. In some embodiments the mold material may be mold compatible with a material of sole plate 16. Those skilled in the art readily will be able to select various combinations of mold materials suitable for a particular application.

Figure 19:
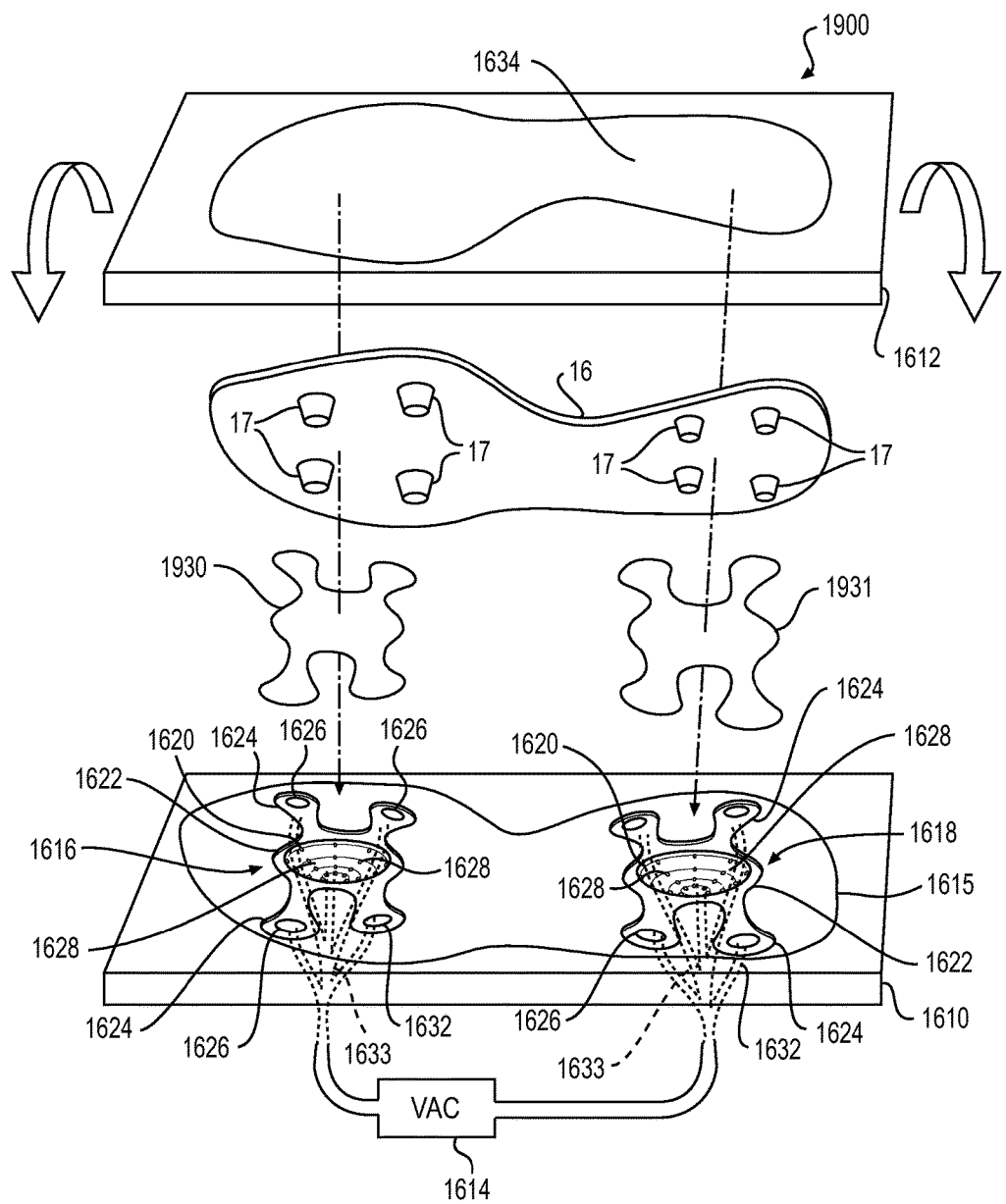
FIG. 19 is an exploded view of a second embodiment of a molding system for making a sole plate having integral ground surface material accumulation prevention structure using a pre-cut mold material blank.

Alternative Molding System for Molding Integral Sole Plate and Ground Surface Material Accumulation Prevention Structure FIG. 19 illustrates an alternative embodiment of a molding system for molding a sole plate for an article of footwear, where the sole plate includes an integral ground material accumulation prevention structure.

FIG. 19 illustrates an embodiment of molding system 1600 in an exploded, open mold configuration. As shown in FIG. 19, in some embodiments a sheet of mold material 1630 illustrated in FIG. 16 may be replaced with one or more mold material blank 1930. As shown in FIG. 19, in some embodiments a mold material blank 1930 may be preformed or pre-cut to provide a mold material blank that is sized and configured to correspond to a size and configuration of a target mold cavity. As shown in FIG. 19, in some embodiments molding system may include a first mold material blank 1930 sized and configured to conform to first mold cavity 1616 in the forefoot area 18 of sole plate 16, and a second material blank 1931 sized and configured to conform to first mold cavity 1618 in the heel area 20 of sole plate 16. In some embodiments, first mold material blank 1930 and second mold material blank 1931 may have a different size and configuration. In some embodiments, first mold material blank 1930 and second mold material blank 1931 may be formed of different mold materials.

Functional Characteristics and Operation

FIGS. 20 to 27 illustrate exemplary functional characteristics and operation of ground surface material accumulation prevention structures of the present invention. As shown in FIGS. 20-27, in some embodiments ground surface material accumulation prevention structure may operate to prevent accumulation of ground surface material on a lower surface of an article of footwear in active use of the article of footwear.

Figure 20:
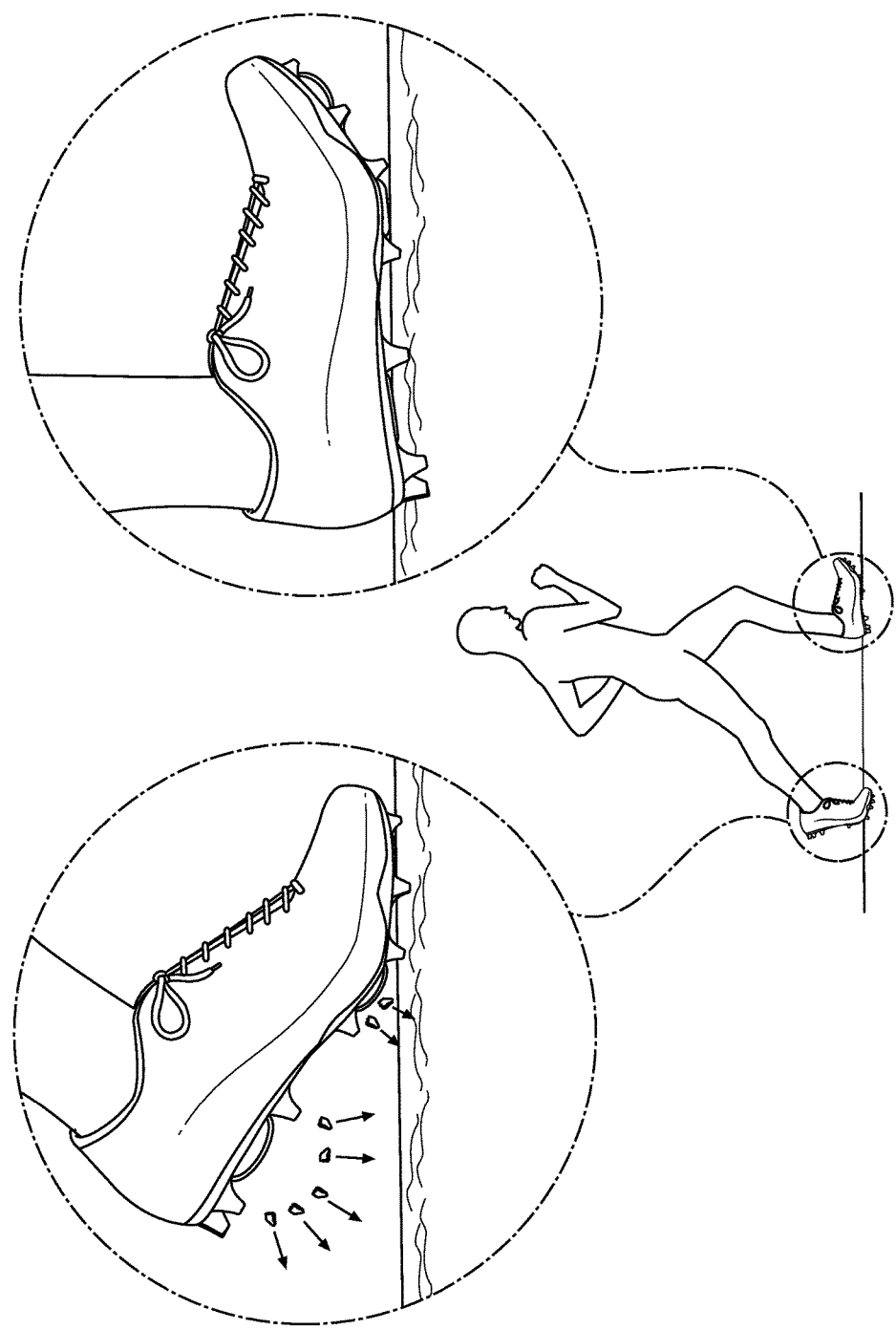
FIG. 20 is a schematic snap-shot profile view of an athlete, illustrating operation of an embodiment of an article of footwear including ground surface material accumulation prevention structure of the present invention.

FIG. 20 is a schematic snap shot view of an athlete, illustrating functional characteristics and operation of ground surface material accumulation prevention structure of the present invention in active use of an article of footwear. In FIG. 20, an athlete is shown in stride during normal athletic activity, such as running, playing soccer or another sport, etc., on a ground surface. The ground surface may include compactable ground surface material, such as mud, gravel, sand, clay, slush (snow, ice, or frost), etc., or various combinations thereof. In FIG. 20, the athlete's left foot is extended in front of the athlete's body in a heel strike state of a stride cycle, where a strike force and weight of the athlete is being transmitted to the ground surface. In this manner, a compression force between the sole 16 of the article of footwear 10 and the ground surface progressively is generated in the heel region 20 to the toe region 24 of the article of footwear 10. In FIG. 20, the athlete's right foot is extended in back of the athlete's body in a toe off state of a stride cycle, where a force and weight of the athlete generally is released. In this manner, a compression force between the sole 16 of the article of footwear 10 and the ground surface progressively is released from the heel region 20 to the toe region 24 of the article of footwear 10.

In FIG. 20, the heel strike state is shown in enlarged view in the upper right hand portion of the figure, and the toe off state is shown in enlarged view in the upper left hand portion of the figure. Although functional characteristics and operation of the ground surface material accumulation prevention structure 12 are described in FIG. 20 with respect to a stride cycle including heel strike and toe off states, this stride cycle is exemplary only to illustrate different functional characteristics and operation states of ground surface material accumulation prevention structure 12 in active use of the article of footwear. Those skilled in the art readily will appreciate that the ground surface material accumulation prevention structure 12 may be used with similar functional characteristics and operation in other stride cycles or methods of active use of the article of footwear, such as running on the balls of the feet, running with a lateral midfoot strike cycle, trapping a soccer ball, etc.

In the exemplary stride cycle shown in FIG. 20, a first article of footwear (left shoe) 10 is shown with three ground surface material accumulation prevention structures 12 in three different operation states associated with a heel strike state of the stride cycle. A first ground surface material accumulation prevention structure 12 located in the toe region 24 of the forefoot region 18 is shown in a fully non-compressed state, where the exposed surface of the reaction element of the ground surface material accumulation prevention structure 12 is fully extended in a dome shape. A second ground surface material accumulation prevention structure 12 located in the balls of the foot region 26 of the forefoot region 18 is shown in a partially compressed state, where the exposed surface of the reaction element of the ground surface material accumulation prevention structure 12 is partially collapsed in a dimpled dome shape. A third ground surface material accumulation prevention structure 12 located in the heel region 20 is shown in a fully compressed state, where the exposed surface of the reaction element of the ground surface material accumulation prevention structure 12 is fully collapsed to lay substantially flat proximal the lower surface of the sole of the article of footwear.

In the exemplary stride cycle shown in FIG. 20, a second article of footwear (right shoe) 10 is shown with three ground surface material accumulation prevention structures 12 in three different operation states associated with a toe off state of the stride cycle. A first ground surface material accumulation prevention structure 12 located in the toe region 24 of the forefoot area 18 is shown in a fully compressed state, where the exposed surface of the reaction element of the ground surface material accumulation prevention structure 12 is fully collapsed to lay substantially flat proximal the lower surface of the sole of the article of footwear. In this state, a thrust force and weight of the athlete is being transferred to the ground surface. A second ground surface material accumulation prevention structure 12 located in the balls of the foot region 26 of the forefoot region 18 is shown in a partially compressed state (partially non-compressed or released state), where the exposed surface of the reaction element of the ground surface material accumulation prevention structure 12 is partially collapsed (partially released) in a dimpled dome shape. And a third ground surface material accumulation prevention structure 12 located in the heel region 20 is shown in a fully non-compressed state (fully released state), where the exposed surface of the reaction element of the ground surface material accumulation prevention structure 12 is fully extended in a dome shape.

FIGS. 21 to 27 illustrate functional characteristics and operation of a single ground surface material accumulation prevention structure with respect to compression forces progressively generated and released between the article of footwear and the ground surface, to prevent accumulation of ground surface material on the lower surface of the article of footwear in active use of the article of footwear. In FIGS. 21-27 an exemplary ground surface material accumulation prevention structure is shown in sectional view to illustrate physical deformation associated with external compression forces applied to, and internal reactive forces generated by, a reactive element of the ground surface material accumulation prevention structure.

Figure 21:
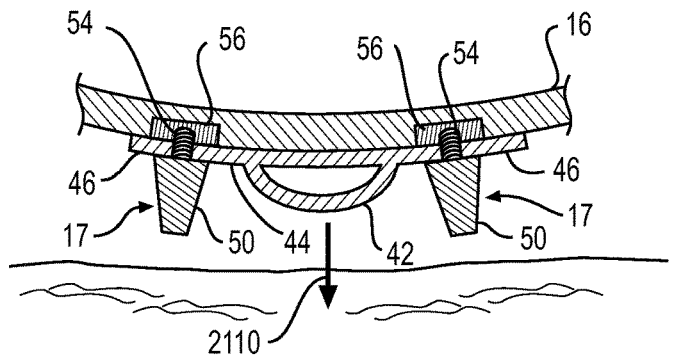
FIG. 21 is a schematic sectional view illustrating the ground surface material accumulation prevention structure in a pre-surface strike state of the stride cycle.

FIG. 21 is a schematic sectional view of a ground surface material accumulation prevention structure illustrating a pre-surface strike state in an operation cycle of the structure. In this state the article of footwear and ground surface material accumulation prevention structure may be descending toward the ground surface, as indicated by arrow 2110. As shown in FIG. 21, in this state the reactive element 42 of the ground surface material accumulation prevention structure 12 is fully non-compressed and extended in a dome shape.

Figure 22:
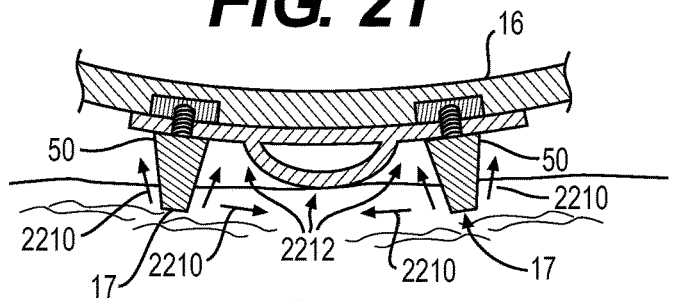
FIG. 22 is a schematic sectional view illustrating the ground surface material accumulation prevention structure in an initial surface strike state of the stride cycle.

FIG. 22 is a schematic sectional view of a ground surface material accumulation prevention structure illustrating an initial surface strike state in an operation cycle of the structure. In the initial surface strike state of FIG. 22, one or more ground surface traction element 17 may contact the ground surface in advance of the ground surface material accumulation prevention structure 12, which is disposed above the ground surface and is fully extended in a dome shape. In this state, the ground surface traction elements 17 may begin to displace ground surface material, as indicated by small solid arrows 2210. In this manner, a portion of ground surface material may be displaced into a space 2212 located under the ground surface material accumulation prevention structure 12 between the ground surface material accumulation prevention structures 17. Those skilled in the art readily will appreciate that the ground surface material, including displaced ground surface material, may begin to compact under the ground surface material accumulation prevention structure 12.

Figure 23:
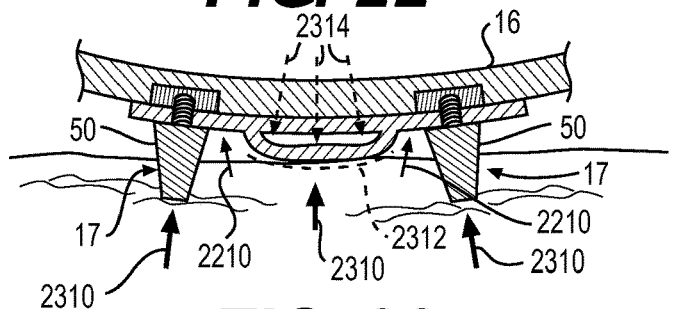
FIG. 23 is a schematic sectional view illustrating the ground surface material accumulation prevention structure in a partial ground penetration state of the stride cycle.

FIG. 23 is a schematic sectional view of a ground surface material accumulation prevention structure illustrating a partial ground penetration state in an operation cycle of the structure. In the partial ground penetration state of FIG. 23, the lower surface 32 of the sole 16 of the article of footwear 10 begins to engage the ground surface with a compression force, as indicated by thick solid arrows 2310. A source of the compression force may include various factors, such as a force of weight of the athlete, a heel strike force, a thrust force (e.g., from an athlete changing a direction of stride or from a toe off push), and the like. Ground surface material located below the ground surface material accumulation prevention structure 12, including ground surface material displaced by a penetrating ground surface traction element 17, may be compacted under the ground surface material accumulation prevention structure 12 by the compression force 2310. In this manner the compression force 2310 may begin to create a layer of compacted surface material (indicated by dashed line) 2312 disposed on the exposed surface of the ground surface material accumulation prevention structure 12.

In the partial ground penetration state illustrated in FIG. 23 the exposed surface of the reactive element 42 of the ground surface material accumulation prevention structure 12 begins to deform by compression, e.g., to dimple. In this manner, a portion of energy generated by the compression force is absorbed by the reactive element 42 of the ground surface material accumulation prevention structure 12; this absorbed energy may be expressed as a reactive force generated in the reactive element 42 that is biased to return the exposed surface of the reactive element 42 to a fully extended dome shape, as indicated by dashed arrows 2314. The reactive force generated by compression of the reactive element 42 is small relative to the compression force 2310 between the sole 16 and the ground surface, as indicated in FIG. 23 by the relative thickness of compression force arrows 2310 and reactive force arrows 2310. The reactive force 2314 generated by the energy absorbed by the reactive element 42 need only be sufficient to return the exposed surface of the reactive element 42 to the fully extended dome shape upon release of the compression force 2314, as discussed below. In this manner, energy of the athlete corresponding to the compression force 2310 is substantially transferred to the ground surface, with a portion of the energy being transferred to reactive element 42 of the ground surface material accumulation prevention structure 12.

Figure 24:
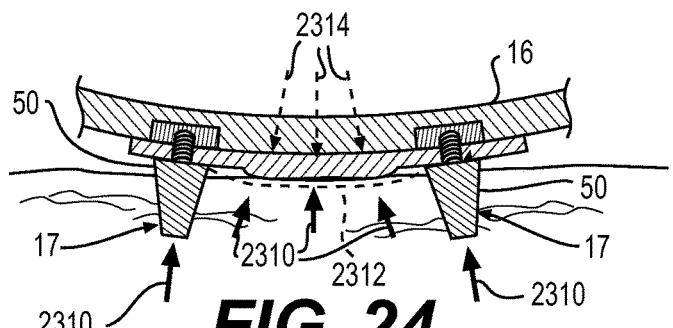
FIG. 24 is a schematic sectional view illustrating the ground surface material accumulation prevention structure in a full ground penetration/compression state of the stride cycle.

FIG. 24 is a schematic sectional view of a ground surface material accumulation prevention structure illustrating a full ground penetration state in the operation cycle of the structure. In the full ground penetration state of FIG. 24, the compression force 2310 at the ground surface material accumulation prevention structure 12 may be at a maximum, with maximum transmission of the energy from the athlete to the ground surface. As shown in the full ground surface penetration state of FIG. 23, the compression force 2310 may be exerted across an entire surface area of the ground surface material accumulation prevention structure 12. As shown in FIG. 23, the compression force 2310 may be substantially greater than the reaction force 2312 absorbed and stored in reaction element 42 of ground surface material accumulation prevention structure 12. As shown in FIG. 24, in the full ground penetration state the layer of compacted ground surface material (indicated by dashed line) 2312 may be formed on the exposed surface of the reaction element 42 of the ground surface material accumulation prevention structure 12.

Figure 25:
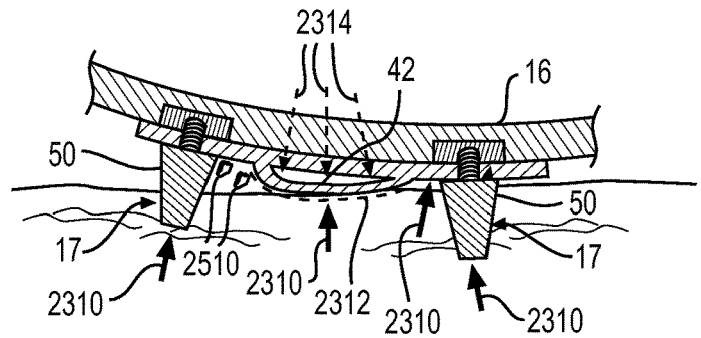
FIG. 25 is a schematic sectional view illustrating the ground surface material accumulation prevention structure in a partial release state of the stride cycle.

FIG. 25 is a schematic sectional view of a ground surface material accumulation prevention structure illustrating an initial release state in an operation cycle of the structure. As shown in FIG. 25, in the initial release state the sole 16 of the article of footwear may begin to lift off from the ground surface. As the sole 16 begins lift off from the ground surface, the layer of compacted ground surface material 2312 may begin to separate from the ground surface proper and become exposed, and a localized compaction force 2310 may begin to release. As the layer of compacted ground surface material 2312 becomes exposed and the localized compaction force 2310 is released, a portion of the reactive energy absorbed and stored in the reactive element 42, expressed as reactive force 2314, may begin to expand a portion of the exposed surface of the reactive element 42 to begin to return the portion of the exposed surface of the reactive element 42 to a non-compressed state, e.g., to an extended dome shape. In some embodiments the surface of the reactive element 42 may begin to move relative to the layer of compacted ground surface material 2312 and generate surface tension forces between the exposed surface of the reactive element 42 and the layer of compacted surface material. In some embodiments the exposed surface of the reactive element 42 may twist or shift to a new orientation relative to the layer of compacted ground surface material 2312. In this manner, expansion of the portion of the exposed surface of the reactive element 42 may cause the layer of compacted ground surface material 2312 to begin to break apart into particles of ground surface material 2510.

Figure 26:
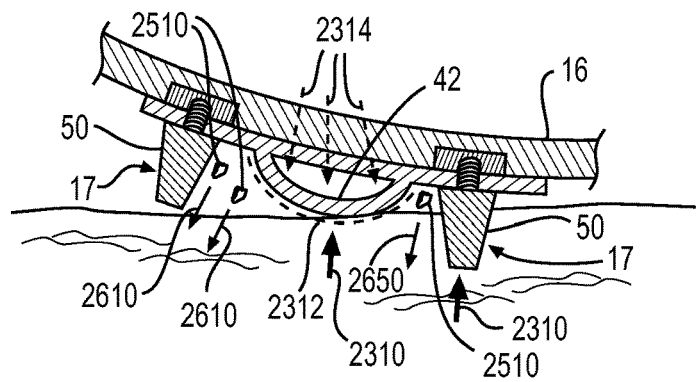
FIG. 26 is a schematic sectional view illustrating the ground surface material accumulation prevention structure in a substantial release state of the stride cycle.

FIG. 26 is a schematic sectional view of a ground surface material accumulation prevention structure illustrating a substantial release state in an operation cycle of the structure. As shown in FIG. 26, in the substantial release state the sole 16 continues to lift off from the ground surface proper. In this state a compression force 2310 may continue to be applied between the ground surface and at least one ground surface traction element 17. In this state, reactive energy absorbed and stored in the reactive element 42 may continue to be expressed as a reactive force 2314 at the exposed surface of the reactive element 42 to expand the exposed surface of the reactive element 42 toward a fully non-compressed state. Continued expansion of the exposed surface of the reactive element 42 may continue to break apart the layer of compressed ground surface material into particles of ground surface material 2510. In some embodiments, in response to release of the compression force 2310, the reactive element 42 may 'pop' the exposed surface of the reactive element 42 to a substantially expanded, non-compressed state (e.g., to a fully expanded dome shape). In this manner, reactive energy absorbed and stored in the reactive element 42 may be transferred to the particles of ground surface material 2510 to expel particles of ground material 2510 from the exposed surface of the reactive element 42, as indicated by arrows 2610.

Figure 27:
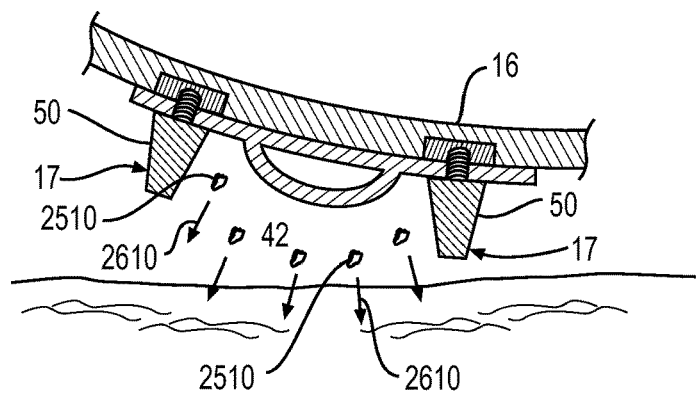
FIG. 27 is a schematic sectional view illustrating the ground surface material accumulation prevention structure in a full release state of the stride cycle.

FIG. 27 is a schematic sectional view of a ground surface material accumulation prevention structure illustrating a full release state in an operation cycle of the structure. In the full release state, the exposed surface of the reactive element 42 is fully extended in a dome shape, and the reactive energy absorbed and stored in the reactive element 42 from the compression force 2310 may be fully transferred from the reactive element 42 to particles of ground surface material 2510, as indicated by arrows 2610. In this manner, ground surface material may be prevented from accumulating on the lower surface 32 of the sole 16 of the article of footwear 10 in active use of the article of footwear 10.

As discussed above, a ground surface material accumulation prevention structure of the present invention may operate to prevent onset of accumulation of ground surface material on a lower surface of a sole of an article of footwear in active use of the article of footwear. As illustrated in FIGS. 20-27, in some embodiments a ground surface material accumulation prevention structure may operate in association with a heel strike to toe off stride cycle in active use of the article of footwear. In some embodiments, a ground surface material accumulation prevention structure may operate in association with other active use of an article of footwear. Non-exhaustive examples include playing sports such as soccer, football, lacrosse, etc., as well as activities in snow, ice, and slush. Those skilled in the art readily will appreciate alternative active use of an article of footwear suitable for a ground surface material accumulation prevention structure of the present invention.

As discussed above, a ground surface material accumulation prevention structure of the present invention may operate to prevent accumulation of ground surface material by moving an exposed surface of a reactive element of the structure between a first position and a second position in response to a compression force applied to the reactive element in active use of the article of footwear. In some embodiments, a reactive element may move an exposed surface of the reactive element between a first state and a second state relative to the lower surface of the article of footwear, e.g., relative to one or more ground surface traction elements on the lower surface of the sole of the article of footwear. In some embodiments, a reactive element may move an exposed surface of the reactive element between a first orientation and a second orientation relative to the lower surface of the sole of the article of footwear, e.g., to twist relative to one or more ground surface traction elements on the lower surface of the sole of the article of footwear. In some embodiments, a reactive element may move an exposed surface of the reactive element between a first surface contour and a second surface contour different from the first surface contour. In some embodiments, a reactive element may move an exposed surface of the reactive element between a first position proximate the lower surface of the sole of the article of footwear and a second position further away from the lower surface of the sole of the article of footwear. In each case a reactive element may be configured to move an exposed surface of the reactive element relative to a layer of compacted ground surface material being formed adjacent the exposed surface in active use of an article of footwear, to facilitate breaking up the layer of compacted ground surface material into particles of ground surface material and discarding of the compacted ground surface material from the lower surface of the article of footwear in the active use of the article of footwear.

Functional, operational, and performance characteristics of a ground surface material accumulation prevention structure may be controlled by selecting materials and dimensional characteristics of the reactive element of the structure. A reactive force characteristic of the reactive element may be determined by controlling various factors, including a material composition of the reactive element, a desired rigidity of the reactive element, a strength of the cured/hardened molding material(s), a thickness of the exposed surface of a dome-shaped reactive element, a depth of the dome shaped reactive element, a size of the reactive element (e.g., radius or length and width), and an amount of molding material desired for making the reactive element (cost factors). Those skilled in the art readily will appreciate other factors in light of the present disclosure and a desired application and performance characteristics. Those skilled in the art readily will be able to determine a material composition, size, and configuration of a reactive element for achieving desired functional, operational, and performance characteristics in a ground surface material accumulation prevention structure.

Those skilled in the art readily will appreciate that each of the embodiments shown in FIGS. 1-27 may have one or more advantages in a particular application. In some applications, one embodiment may have a more desired performance characteristic, such as providing a desired reactive force characteristic, providing a desired traction characteristic for a selected playing surface, or providing a desired safety characteristic. In some embodiments, one embodiment may have a more desired aesthetic characteristic than another embodiment. Those skilled in the art readily will be able to select an appropriate configuration for a desired application.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. An article of footwear comprising:
a sole having a lower surface and a ground surface traction element disposed on the lower surface; and
a ground surface material accumulation prevention structure disposed on the lower surface of the sole and including a webbing and a reactive element that are integrally formed with the sole, the webbing covering a distal end of the ground surface traction element and the reactive element having an exposed surface and being configured to transition the exposed surface between a first state and a second state in response to a compression force applied to the reactive element by an external ground surface in a user activity to prevent accumulation of ground surface material compacting on the sole of the article of footwear in the user activity.

2. The article of footwear according to claim 1, wherein the webbing is configured to secure the reactive element on the lower surface of the sole.

3. The article of footwear according to claim 1, wherein the reactive element is integrally formed with the lower surface of the sole by bonding or molding.

4. The article of footwear according to claim 1, wherein the reactive element is secured to the lower surface of the sole by the webbing at the ground surface traction element.

5. The article of footwear according to claim 1, wherein the ground surface traction element includes at least one cleat, the webbing extending over the at least one cleat to secure the reactive element on the lower surface of the sole.

6. The article of footwear according to claim 1, wherein the webbing covers plural ground surface traction elements disposed on the lower surface of the sole.

7. The article of footwear according to claim 1, wherein the webbing is configured to secure the reactive element to the lower surface of the sole of the article of footwear, wherein the webbing and the reactive element are formed by a unitary resilient material.

8. The article of footwear according to claim 1, wherein the reactive element comprises an elastomeric polymer dome that is made of a thermoplastic or thermosetting material.

9. The article of footwear according to claim 8, wherein the elastomeric polymer dome has a symmetric shape or an elongated shape.

10. The article of footwear according to claim 1, wherein in the first state the exposed surface is in a compressed state and is located proximal the lower surface of the sole, and wherein in the second state the exposed surface is in a decompressed state and is located distal of the lower surface of the sole relative to the first state.

11. The article of footwear according to claim 1, wherein the reactive element is formed from a material that is configured to transition the exposed surface to the first state in response to a compression force applied between the sole of the article of footwear and the external ground surface and to the second state in response to release of the compression force.

12. The article of footwear according to claim 1, wherein the reactive element includes a resilient member having a spring constant k.

* * * * *